（12） United States Patent
McNallan et al.

(10) Patent No.: US 8,922,140 B2
(45) Date of Patent: Dec. 30, 2014

(54) DUAL POTENTIOMETER ADDRESS AND DIRECTION SELECTION FOR AN ACTUATOR

(71) Applicant: Honeywell International Inc., Morristown, NJ (US)

(72) Inventors: Torrey William McNallan, Plymouth, MN (US); Daniel Waseen, Minneapolis, MN (US); Paul Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 116 days.

(21) Appl. No.: 13/794,232

(22) Filed: Mar. 11, 2013

(65) Prior Publication Data
US 2014/0142758 A1 May 22, 2014

Related U.S. Application Data

(63) Continuation-in-part of application No. 13/293,041, filed on Nov. 9, 2011.

(51) Int. Cl.
*H02K 7/14* (2006.01)
*G05B 15/02* (2006.01)
*G05B 19/042* (2006.01)
*H04L 29/12* (2006.01)

(52) U.S. Cl.
CPC ............ *G05B 15/02* (2013.01); *G05B 19/0423* (2013.01); *G05B 2219/21071* (2013.01); *H04L 61/2038* (2013.01)
USPC .......... 318/3; 318/565; 318/568.16; 318/466; 318/467

(58) Field of Classification Search
USPC .......... 318/3, 4, 8, 15, 560, 565, 568.16, 625, 318/626, 663, 466, 467, 468
See application file for complete search history.

(56) References Cited

U.S. PATENT DOCUMENTS 3,829,848 A 8/1974 Eickelberg et al.
4,129,847 A 12/1978 Teichert
(Continued)

FOREIGN PATENT DOCUMENTS

DE 202004011803 12/2004
EP 0511828 11/1992
(Continued)

OTHER PUBLICATIONS

Honeywell, "Spyder Sylk Enhanced, Advanced Control From a Unitary Controller," 8 pages, Mar. 2009.
(Continued)

*Primary Examiner* — Bentsu Ro
*Assistant Examiner* — Thai Dinh
(74) *Attorney, Agent, or Firm* — Seager Tufle & Wickhem LLC

(57) ABSTRACT

An actuator having two or more potentiometers for setting an address for use with a communications bus or the like. An adjustment or setting of the potentiometers may be accessible at two or more sides outside of a housing enclosing the actuator. One potentiometer may be set to a direction of control and a range of addresses. Another potentiometer may be set to one of several addresses within a range of addresses and direction of control selected on the first potentiometer.

20 Claims, 29 Drawing Sheets

(56) References Cited

U.S. PATENT DOCUMENTS

| | | |
|---|---|---|
| 4,302,931 A | 12/1981 | White et al. |
| 4,549,446 A | 10/1985 | Beeson |
| 4,628,268 A | 12/1986 | Matsubara |
| 4,652,417 A | 3/1987 | Sutherland et al. |
| 4,673,920 A | 6/1987 | Ferguson et al. |
| 4,688,183 A | 8/1987 | Carll et al. |
| 4,742,475 A | 5/1988 | Kaiser et al. |
| 4,794,314 A | 12/1988 | Janu et al. |
| 4,795,867 A | 1/1989 | Ohi et al. |
| 4,854,852 A | 8/1989 | Patton et al. |
| 5,025,206 A | 6/1991 | Germer et al. |
| 5,081,405 A * | 1/1992 | Nelson .................. 318/448 |
| 5,153,493 A | 10/1992 | Jornod et al. |
| 5,159,534 A | 10/1992 | Hudson et al. |
| 5,180,959 A * | 1/1993 | Christopher .............. 318/626 |
| 5,318,516 A | 6/1994 | Cosmescu |
| 5,416,781 A | 5/1995 | Ruiz |
| 5,422,553 A | 6/1995 | MacLennan et al. |
| 5,431,182 A | 7/1995 | Brown |
| 5,446,677 A | 8/1995 | Jensen et al. |
| 5,454,273 A | 10/1995 | Smith |
| 5,465,031 A | 11/1995 | Nilssen |
| 5,584,319 A | 12/1996 | Cholin |
| 5,621,398 A | 4/1997 | Blair et al. |
| 5,682,329 A | 10/1997 | Seem et al. |
| 5,711,480 A | 1/1998 | Zepke et al. |
| 5,744,925 A | 4/1998 | Madsen |
| 5,848,609 A | 12/1998 | Marchessault et al. |
| 6,025,788 A | 2/2000 | Diduck |
| 6,035,878 A | 3/2000 | Adams et al. |
| 6,051,948 A | 4/2000 | Vepy |
| 6,059,046 A | 5/2000 | Lowry |
| 6,121,735 A | 9/2000 | Igeta et al. |
| 6,178,997 B1 | 1/2001 | Adams et al. |
| 6,249,100 B1 | 6/2001 | Lange |
| 6,415,617 B1 | 7/2002 | Seem |
| 6,431,203 B1 | 8/2002 | Zhu et al. |
| 6,431,231 B1 | 8/2002 | Braaten et al. |
| 6,443,422 B1 | 9/2002 | Gluf, Jr. |
| 6,505,991 B2 | 1/2003 | Roman |
| 6,651,952 B1 | 11/2003 | Hightower et al. |
| 6,725,976 B2 | 4/2004 | Oh et al. |
| 6,772,018 B2 | 8/2004 | Juntunen et al. |
| 6,838,988 B2 | 1/2005 | Lennartz et al. |
| 6,851,620 B2 | 2/2005 | Hill |
| 6,915,171 B2 | 7/2005 | Mayer |
| 6,917,178 B2 * | 7/2005 | Takeuchi et al. .............. 318/625 |
| 6,922,123 B2 | 7/2005 | Lalonde et al. |
| 6,954,044 B2 | 10/2005 | McMillan et al. |
| 6,979,965 B2 * | 12/2005 | McMillan et al. ............ 318/160 |
| 7,021,072 B2 | 4/2006 | McMillan et al. |
| 7,024,282 B2 | 4/2006 | Coogan et al. |
| 7,031,880 B1 | 4/2006 | Seem et al. |
| 7,033,268 B2 | 4/2006 | Caliendo et al. |
| 7,058,542 B2 | 6/2006 | Hauhia et al. |
| 7,066,273 B2 | 6/2006 | Tan |
| 7,079,831 B2 | 7/2006 | Schwartzman et al. |
| 7,105,949 B2 | 9/2006 | Wang et al. |
| 7,188,481 B2 | 3/2007 | DeYoe et al. |
| 7,241,218 B2 | 7/2007 | Van Becelaere et al. |
| 7,265,512 B2 | 9/2007 | McMillan et al. |
| 7,378,980 B2 | 5/2008 | McFarland |
| 7,401,541 B2 | 7/2008 | McCarroll et al. |
| 7,442,068 B2 | 10/2008 | Hammer et al. |
| 7,446,494 B2 | 11/2008 | Grabinger et al. |
| 7,451,759 B2 | 11/2008 | Weiss et al. |
| 7,460,013 B1 | 12/2008 | Osborne et al. |
| 7,476,988 B2 | 1/2009 | Mulhouse et al. |
| 7,477,028 B2 | 1/2009 | Bokusky et al. |
| 7,492,233 B2 | 2/2009 | Grabinger |
| 7,525,266 B2 | 4/2009 | Bolusky et al. |
| 7,533,635 B2 | 5/2009 | Bradley et al. |
| 7,557,549 B2 | 7/2009 | Underhill |
| 7,586,279 B2 | 9/2009 | Theunissen et al. |
| 7,622,828 B2 | 11/2009 | Grabinger et al. |
| 7,633,393 B2 | 12/2009 | Bonne |
| 7,636,613 B2 | 12/2009 | Borah et al. |
| 7,639,127 B2 | 12/2009 | Kastli |
| 7,653,459 B2 | 1/2010 | Pouchak et al. |
| 7,664,573 B2 | 2/2010 | Ahmed |
| 7,672,913 B2 | 3/2010 | Kaplan et al. |
| 7,697,492 B2 | 4/2010 | Petite |
| 7,774,441 B2 | 8/2010 | Frutiger et al. |
| 7,784,291 B2 | 8/2010 | Butler et al. |
| 7,787,994 B2 | 8/2010 | Wacker |
| 7,798,170 B2 | 9/2010 | Hotz et al. |
| 7,802,734 B2 | 9/2010 | Stanimirovic |
| 7,831,338 B1 | 11/2010 | Haydu |
| 7,840,311 B2 | 11/2010 | Grohman |
| 7,852,765 B2 | 12/2010 | Neuman et al. |
| 7,876,217 B2 | 1/2011 | Laackmann et al. |
| 7,881,678 B2 | 2/2011 | Menden et al. |
| 7,891,241 B2 | 2/2011 | McSheffrey et al. |
| 7,922,149 B2 | 4/2011 | Anderson et al. |
| 7,944,672 B1 | 5/2011 | Chiang |
| 7,966,438 B2 | 6/2011 | Punyko et al. |
| 8,031,650 B2 | 10/2011 | Petite et al. |
| 8,084,980 B2 * | 12/2011 | Carlson et al. .................. 318/471 |
| 8,084,982 B2 | 12/2011 | Grabinger et al. |
| 8,147,302 B2 | 4/2012 | Desrochers et al. |
| 8,218,547 B2 | 7/2012 | Van Steen et al. |
| 8,588,983 B2 | 11/2013 | Grabinger et al. |
| 2002/0152298 A1 | 10/2002 | Kikta et al. |
| 2003/0018398 A1 | 1/2003 | Juntunen et al. |
| 2003/0052180 A1 | 3/2003 | Huhn et al. |
| 2003/0178257 A1 | 9/2003 | Oh et al. |
| 2004/0124797 A1 | 7/2004 | Takeuchi et al. |
| 2004/0212336 A1 | 10/2004 | McMillan et al. |
| 2005/0127861 A1 | 6/2005 | McMillan et al. |
| 2006/0035580 A1 | 2/2006 | Anderson et al. |
| 2006/0130502 A1 | 6/2006 | Wruck et al. |
| 2007/0120664 A1 | 5/2007 | Bilbrey et al. |
| 2007/0176570 A1 | 8/2007 | Bokusky et al. |
| 2007/0226318 A1 | 9/2007 | Rydberg et al. |
| 2008/0051024 A1 | 2/2008 | Caliendo et al. |
| 2008/0111512 A1 | 5/2008 | Theunissen et al. |
| 2008/0244104 A1 | 10/2008 | Clemente |
| 2008/0258253 A1 | 10/2008 | Fey et al. |
| 2008/0316039 A1 | 12/2008 | White et al. |
| 2009/0005917 A1 | 1/2009 | Hole |
| 2009/0033513 A1 | 2/2009 | Salsbury et al. |
| 2009/0082880 A1 | 3/2009 | Saunders |
| 2009/0101725 A1 | 4/2009 | Dolan et al. |
| 2010/0077254 A1 | 3/2010 | Erdmann et al. |
| 2010/0102973 A1 | 4/2010 | Grohman et al. |
| 2010/0106262 A1 | 4/2010 | Schreyer et al. |
| 2010/0106836 A1 | 4/2010 | Schreyer et al. |
| 2010/0109675 A1 | 5/2010 | Wong et al. |
| 2010/0121613 A1 | 5/2010 | Rosca et al. |
| 2010/0134934 A1 | 6/2010 | Matsubara et al. |
| 2010/0141243 A1 | 6/2010 | Divicino et al. |
| 2010/0194326 A1 | 8/2010 | Carlson et al. |
| 2010/0253270 A1 | 10/2010 | Kuster et al. |
| 2011/0070904 A1 | 3/2011 | McFarland |
| 2013/0082634 A1 | 4/2013 | Bokusky et al. |
| 2013/0103324 A1 | 4/2013 | Waseen et al. |
| 2013/0113402 A1 | 5/2013 | Grabinger et al. |
| 2013/0116832 A1 | 5/2013 | Grabinger et al. |
| 2013/0116833 A1 | 5/2013 | Grabinger et al. |
| 2013/0116834 A1 | 5/2013 | Grabinger et al. |

FOREIGN PATENT DOCUMENTS

| | | |
|---|---|---|
| EP | 1170036 | 1/2002 |
| EP | 1901145 | 3/2008 |
| EP | 2241834 | 10/2010 |
| GB | 1172789 | 12/1969 |
| JP | 57086544 | 5/1982 |
| JP | 60091411 | 5/1985 |
| JP | 63257802 | 10/1988 |

(56) References Cited

FOREIGN PATENT DOCUMENTS

| | | |
|---|---|---|
| JP | 1215633 | 8/1989 |
| JP | 2009118155 | 5/2009 |
| WO | WO 2010000077 | 1/2010 |

OTHER PUBLICATIONS

Honeywell, "Spyder Sylk Enhanced," 11 pages, Oct. 2008.
ControlTrends Article Entitled, "Honeywell Zelix Actuators," 1 page, published on the Internet Nov. 11, 2009.
Ruff, "Servo Motor Control Application on a Local Interconnection Network (LIN)," Rev. 1.0, Dec. 2005.
Siemens, "OpenAir—Robust Damper Actuators for Energy-Efficient Ventilation, Durable Actuators for HVAC Applications, Air Volume Controllers as well as Fire and Smoke Protection Dampers," 10 pages, 2011.
"555 Timer IC," Wikipedia, the Free Encyclopedia, 9 pages, Aug. 7, 2012.
Beckhoff New Automation Technology, "Application Note DK9222-0810-0035, I/O, Building Automation," 7 pages, Aug. 2010.
Belimo, "Belimo Gateway MP to Modbus RTU-UK24MOD," Product Information, 20 pages, Feb. 2010.
Belimo, "Damper Actuator Plug-In Description/Documentation #Tools-007-E_20.11.05," 11 pages, Nov. 20, 2005.
Belimo, "MP-Bus-Interface—for Belimo Damper Actuators," 16 pages, Oct. 2009.
Belimo, "Perfect for Each and Every Connection, Bus Integration of Actuators and Sensors in Heating, Ventilation, and Air Conditioning Systems," 10 pages, prior to Sep. 30, 2011.
Belimo, "Ring Bus Solution by Belimo, State of the Art System for Bus Integrated Fire Protection and Smoke Control," 6 pages, prior to Sep. 30, 2011.
U.S. Appl. No. 13/896,901, filed May 17, 2013.
Delta Controls, "HVAC Application Controllers DVC-V322," Document Edition 2.0, 7 pages, Feb. 2005.
Distech Controls, "ECC-VAV/ECC-VVT easyCONTROLS LonMark Certified Application Specific Single Duct Variable Air Volume/Variable Volume Temperature Controllers," 5 pages, prior to Sep. 30, 2011.
Echelon, "LNS Plug-In Belimo," 1 page, 2011.
Honeywell, "3 Nm, 5 Nm Series Spring Return Direct Coupled Actuators, MS3103, MS3105, MS4103, MS4105, MS7403, MS7405, MS7503, MS7505, MS8103, MS8105," Installation Instructions, 12 pages, 2011.
Honeywell, "Advanced Control from a Unitary Controller," 8 pages, Mar. 2009.
Honeywell, "Jade Economizer Module (Model W7220)," Installation Instructions, 20 pages, 2010.
Honeywell, "ML4202, ML4302, ML4702, ML4802, ML8202, ML8302 Fast-Acting, Two-Position Actuators for Fire/Smoke Control Applications," Installation Instructions, 4 pages, 2005.
Honeywell, "S05, S10, S20 Series Spring Return Direct Coupled Actuators, MS4105, MS4110, MS4120, MS71XX, MS7505, MS7510, MS7520, MS8105, MS8110, MS8120," Product Data, 16 pages, 2008.
Honeywell, "Spyder Lon Programmable, VAV/Unitary Controllers," Product Data, 24 pages, 2009.
Johnson Controls Unitary Products, "YCCS Zone Bypass Damper Assembly," 6 pages, 2008.
Microchip Technology, Inc., "Using PWM to Generate Analog Output AN538," 2 pages, 1997.
Motorola, "Triacs Silicon Bidirectional Triode Thyristors," 2 pages, prior to Sep. 30, 2011.
MP-Bus Technology by Belimo, "MP-Bus Convenient and Secure Integration of Belimo Actuator Drives," 1 page, prior to Sep. 30, 2011.
Noliac, "Noliac Acquires Piezo Actuator Drive Technology from Siemens," 2 pages, prior to Sep. 30, 2011.
On Semiconductor, "AND8054/D Designing RC Oscillator Circuits with Low Voltage Operational Amplifiers and Comparators for Precision Sensor Applications," 3 pages, Jul. 2001.
Siemens, "BACnet ATEC," Technical Specification Sheet Document No. 149-825, 4 pages, Apr. 9, 2010.
Siemens, "Siemens, BACnet VAV Actuator," Technical Specification Sheet Rev. AA, 5 pages, Jan. 2008.
Tridium, "Belimo and Tridium to Jointly Develop a Next Generation VAV Controller with Wireless Communications," 2 pages, May 15, 2008.
Wang et al., "Research on Reliability of a Hybrid Three-Redundant Electro-Mechanical Actuator," Proceedings of the 2009 IEEE International Conference on Mechatronics and Automation, Aug. 9-12, 2009.

* cited by examiner

_US 8,922,140 B2_

DUAL POTENTIOMETER ADDRESS AND DIRECTION SELECTION FOR AN ACTUATOR

This application is a continuation-in-part of U.S. patent application Ser. No. 13/293,041, filed Nov. 9, 2011, and entitled "An Actuator having an Address Selector". U.S. patent application Ser. No. 13/293,041, filed Nov. 9, 2011, is hereby incorporated by reference.

BACKGROUND

The present disclosure pertains to control devices and particularly to mechanical movers of devices. More particularly, the disclosure pertains to actuators.

SUMMARY

The disclosure reveals an actuator having two or more potentiometers for setting an address for use with a communications bus or the like. An adjustment or setting of the potentiometers may be accessible at two or more sides outside of a housing enclosing the actuator. One potentiometer may be set to a direction of control and a range of addresses. Another potentiometer may be set to one of several addresses within a range of addresses and direction of control selected on the first potentiometer.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Setting a network address on a communicating actuator may be a challenge for several reasons. The actuator may typically be located in a difficult space to reach (e.g., in the ceiling or behind equipment). Related-art approaches for setting an address may typically be small and difficult to see and actuate (e.g., dip switches/rotary encoders). For instance, using binary methods may require multiple microcontroller input pins. Other addressing implementation schemes may be limited in the total number of unique addresses that can be achieved which limits the number of devices that can be used at the same time. Another challenge may be a need to be able to select a direction of control at the actuator.

The present approach may remove various challenges by using a pair of potentiometers to set and establish a network address and the direction of control for a communicating actuator. The approach may allow for the address selector to be accessible from two or more sides of the actuator. The numbers and interface of the selector may be designed to be large and easy to read. An address may be selected using just two analog inputs for a microcontroller. The analog inputs may be converted to digital signals.

The pair of potentiometers may be used in combination to set the direction of control ("Direct" or "Reverse") and an address. The first potentiometer may be used to select the direction of control and a range of addresses. The second potentiometer may be used to select an address from the range selected with the first potentiometer.

Figure 1:
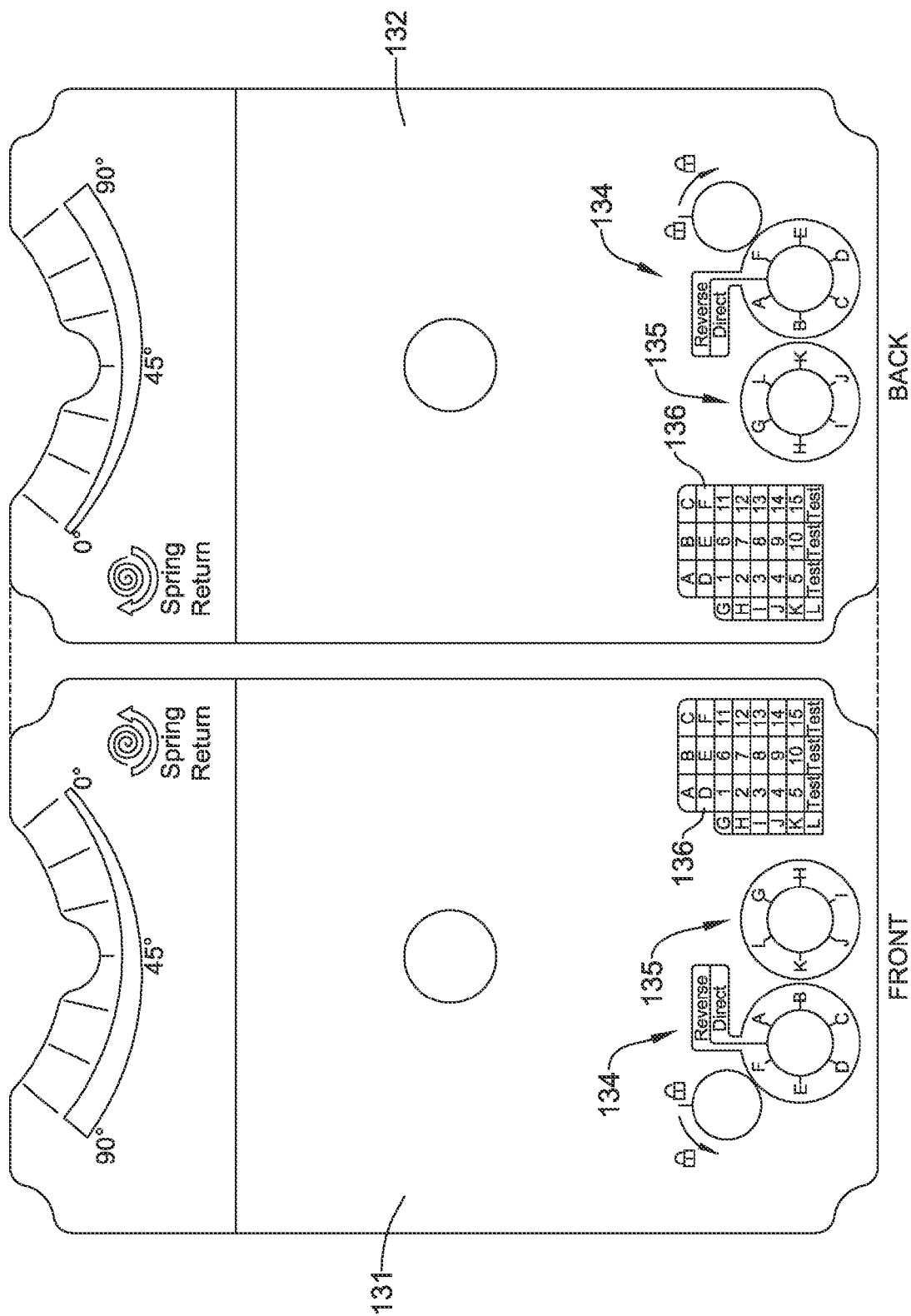
FIG. 1 is a diagram of two potentiometers used to set an address.
Figure 2:
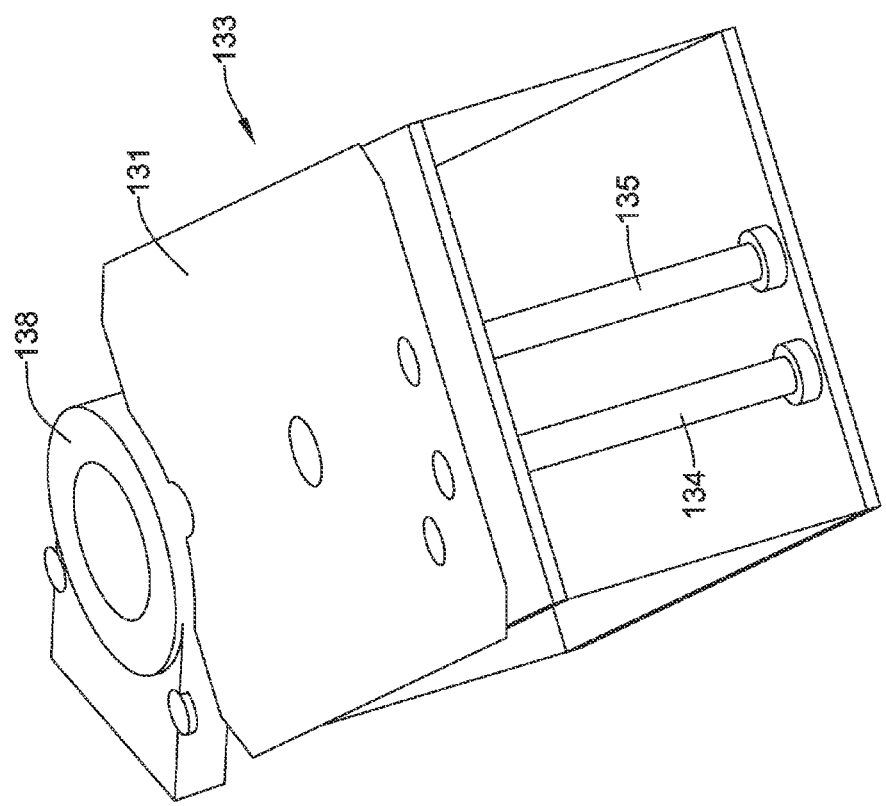
FIG. 2 is a diagram of a structure of an actuator showing internal components of the potentiometers.

FIG. 1 is a diagram revealing a front plate 131 and a back plate 132 for an actuator 133 shown in a diagram of FIG. 2. A first potentiometer 134 may have positions for direct and reverse directions of control of actuator 133. Structure 138 of actuator 133 may be secured to a shaft or the like of a mechanism that is moved or controlled in a direct or reverse direction by structure 138. Positions designated for potentiometers 134 and 135 may be labeled on plates 131 and 132, respectively. Positions A, B and C of potentiometer 134 may be for the direct direction of control. Positions of potentiometer 134 designated D, E and F may be for the reverse direction of control. Positions A and D, B and E, and C and F may represent first, second and third ranges, respectively, for each of both directions of control on potentiometer 134.

For each range and direction, an address may be selected by a second potentiometer 135. Potentiometer 135 may have positions designated G, H, I, J and L. These positions may indicate addresses to be selected by the potentiometer. The L position for each direction and range may be a test position.

With the three ranges for direct direction and five address selections for each range, there may be fifteen address selections. The same number of address selections may be available for the reverse direction of control. The arrangement may result in an availability of thirty address selections. A table 136 on the front plate 132 and back plate 133 illustrate the available selections for directions, ranges, addresses and tests. Table 136 may be used to determine which setting to use to achieve the desired address. Actuator 133 and its potentiometers 134 and 135 may be designed to have more or less than three ranges for each direction, and more or less than five address selections for each range.

Coupled actuators may be used within heating, ventilating and air-conditioning (HVAC) systems. They may drive final control elements. Example applications may incorporate volume control dampers, mounted directly to the drive shaft of the actuator or remotely with the use of accessory hardware, rotary valves such as ball or butterfly valves mounted directly to the actuator drive shaft, and linear stroke or cage valves mounted with linkages to provide linear actuation. The actuator may also be used to operate ventilation flaps, louvers and other devices. The actuator may be a spring return device designed for clockwise or counterclockwise fail-safe operation with a continuously engaged mechanical spring. The spring may return the actuator or the mechanism that the actuator is operating to a fail-safe position within a certain time of power loss. An example of the certain time may be 25 seconds. The actuator may be mounted to provide clockwise or counterclockwise spring return by flipping or turning the unit over. The stroke of the actuator may be adjusted for an application at hand. An auxiliary knob may be used to control minimum position or switch position. For switch position, a degree of rotation may be selected for where the switch is desired to activate. The actuator may have an override of the control signal for certain applications such as for example freeze protection. The override may move the actuator to a full open or full closed position. One instance of position change is that the actuator may be designed to respond to direct digital control (DDC) instantaneous contact closures.

Figure 3:
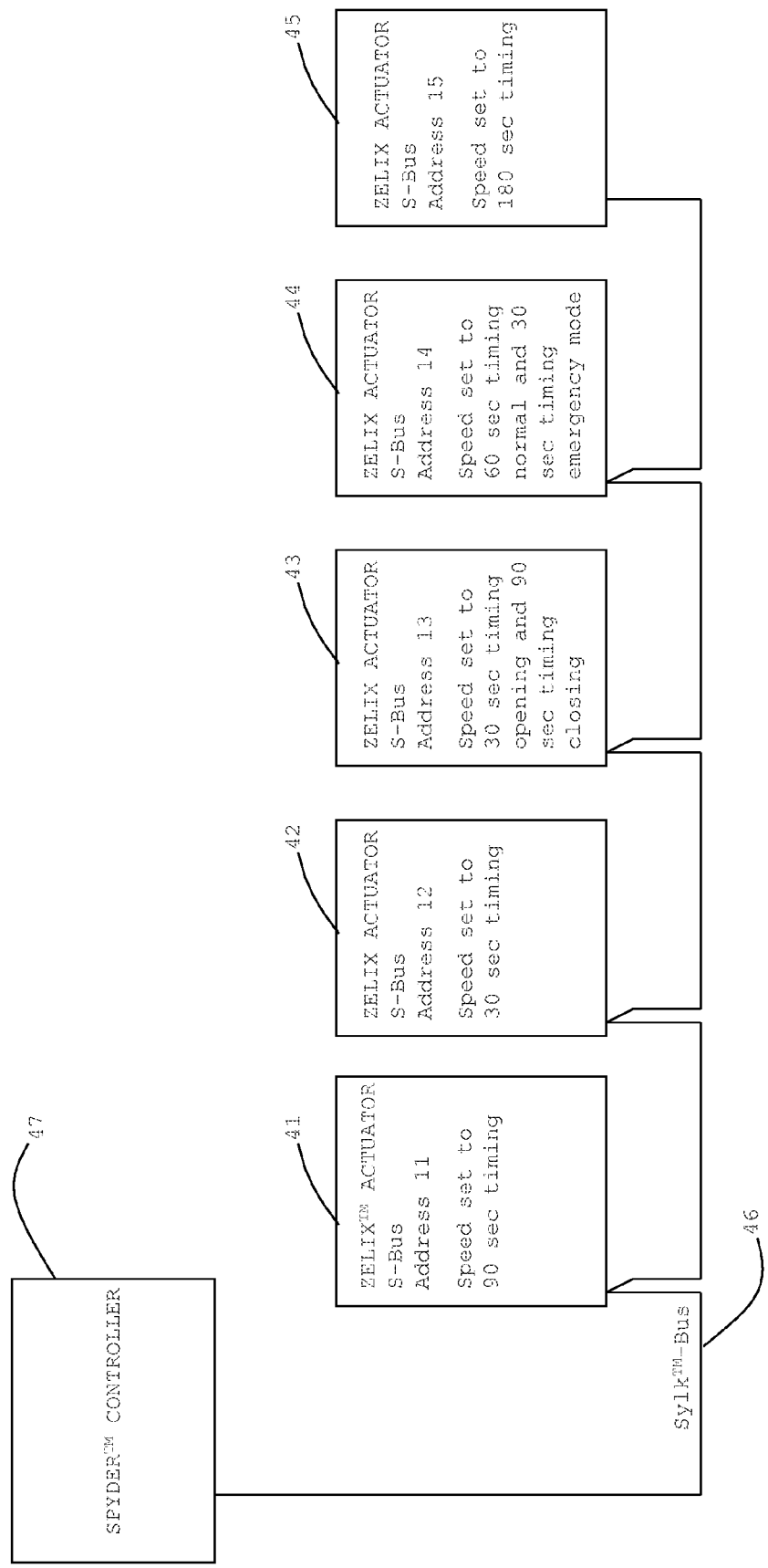
FIG. 3 is a diagram of an example layout of actuators and a controller connected to a common bus.

FIG. 3 is a diagram of an example layout of actuators 41, 42, 43, 44 and 45 connected to a common bus 46. Bus 46 may be connected to a controller 47. Controller 47 may be Spyder™ controller. Bus 46 may be a Sylk™ bus. The actuators may be Zelix™ actuators. The trademark ™ items noted in the present description are those of Honeywell International Inc.

Each actuator may have its open and close speeds individually set by controller 47 via signals on bus 46. For examples of various settings, actuator 41 may have a speed set to a 90 second timing, actuator 42 a speed set to a 30 second timing; actuator 43 a speed set to a 30 second timing for opening and a 90 second timing for closing, actuator 44 a speed set to a 60 second timing for a normal mode and a 30 second timing for an emergency mode, and actuator 45 a speed set for a 180 second timing. The speeds each of the actuators may be set to different timings. When a speed of an individual actuator is set by controller 47, the respective actuator may be selected according to its address. Fir instance, actuators 41, 42, 43, 44 and 45 may have addresses 11, 12, 13, 14 and 15, respectively.

Figure 4:
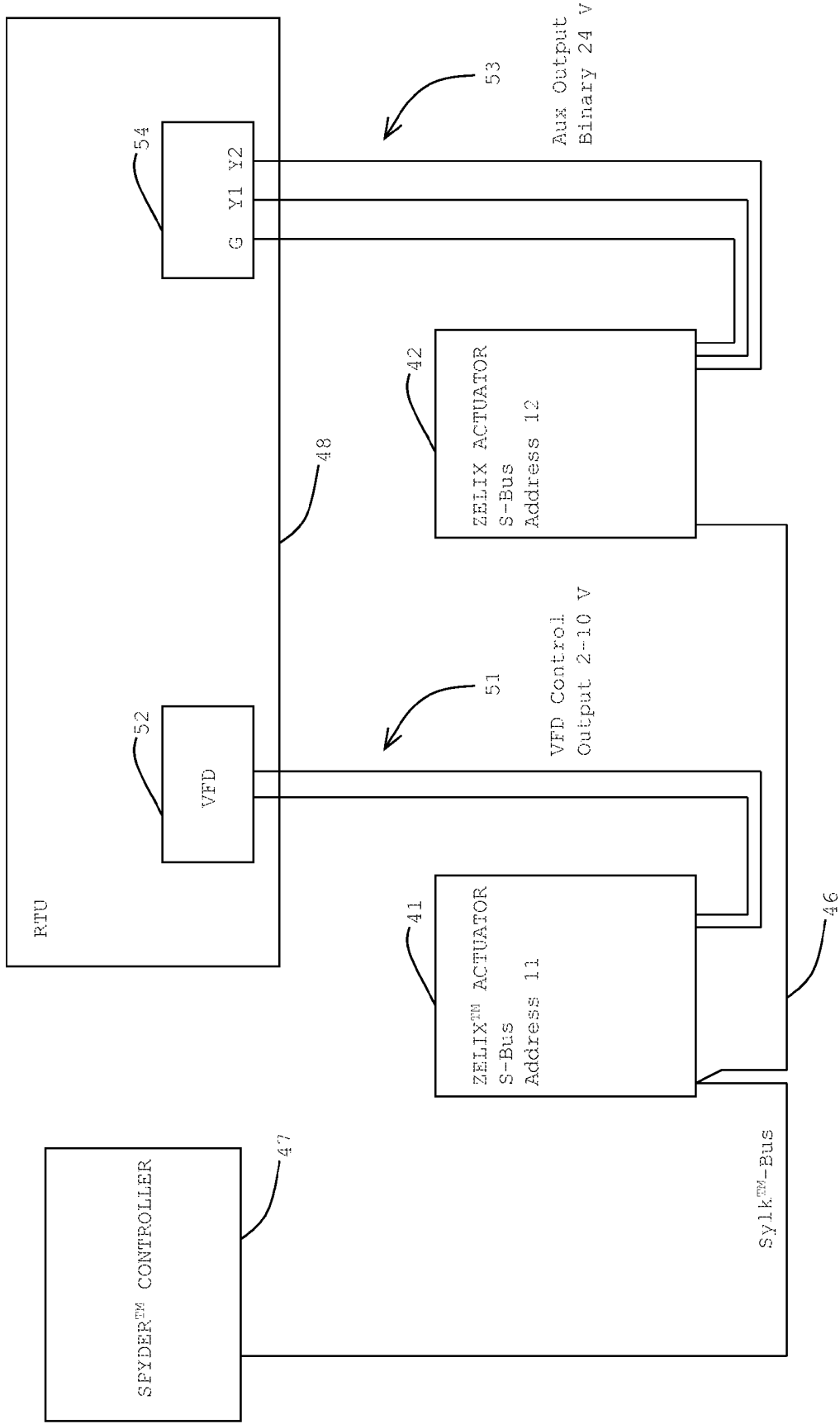
FIG. 4 is a diagram of actuators connected to a controller via a bus and to a roof top unit.

FIG. 4 is a diagram of actuators 41 and 42 connected to controller 47 via bus 46. Actuators 41 and 42 may have connections to a roof top unit (RTU) 48. Actuator 41 may have a variable frequency drive control output of 2 to 10 volts along lines 51 to a component 53 at RTU 48. Actuator 42 may have an auxiliary output binary 24 volts along lines to a component 54 of RTU 48.

A present actuator with an auxiliary output may be adjustable via network communications. Auxiliary (aux) switches on actuators in some of the related art may have their setpoints established locally on the actuator. Setting an auxiliary switch setpoint may be rather difficult because of an actuator location (e.g., in a ceiling or behind equipment) and in general auxiliary switch setpoint user interfaces may be difficult to set and see (e.g., cam systems, rotating assemblies and adjustable detents) which could lead to setpoint inaccuracies. Also, there may be a fixed hysteresis with each of these solutions.

An additional problem with some of the solutions in the related art is that they are not necessarily adjustable as a relevant application changes. For example, an aux switch may be set to make or break at around 45 degrees of the actuator's stroke. If set for 45 degrees, the aux switch may virtually always trip at that position and can not necessarily be changed without a service technician physically changing the setpoint. Some applications would benefit by having the aux switch make at 20 degrees while opening, and break at 60 degrees while closing, or 20 degrees during a heat mode and 45 degrees during a cool mode, or vice versa.

Also, some of the aux switches of the related art may only be able to change state based on an actuator shaft position. There may be many applications where switching the aux switch based on temperature or some other variable (or combination of variables) would be beneficial.

The present approach may solve the issues by allowing the auxiliary switch setpoint and control parameters to be configured remotely over the bus in real time. This approach may be implemented with digital or analog outputs and there could be a multiple setpoint per relay solution.

The present approach may be effected by enhancing the software in the controller and communicating actuator systems. It may be used by allowing the auxiliary switch parameters to be programmable via a higher order controller. An example may incorporate using a Jade controller or Spyder™ controller with Niagara™ (or fishsim™) to program the functionality of a Sylk™ Zelix™ communicating actuator over a Sylk™ bus. A Sylk™ bus may be a two-wire, polarity insensitive bus that may provide communications between a Sylk™-enabled actuator and a Sylk™-enabled controller. An example of the Sylk™ bus circuitry may be disclosed in U.S. Pat. No. 7,966,438, issued Jun. 21, 2011, and entitled "Two-wire Communications Bus System". U.S. Pat. No. 7,966,438, issued Jun. 21, 2011, is hereby incorporated by reference.

Figure 5:
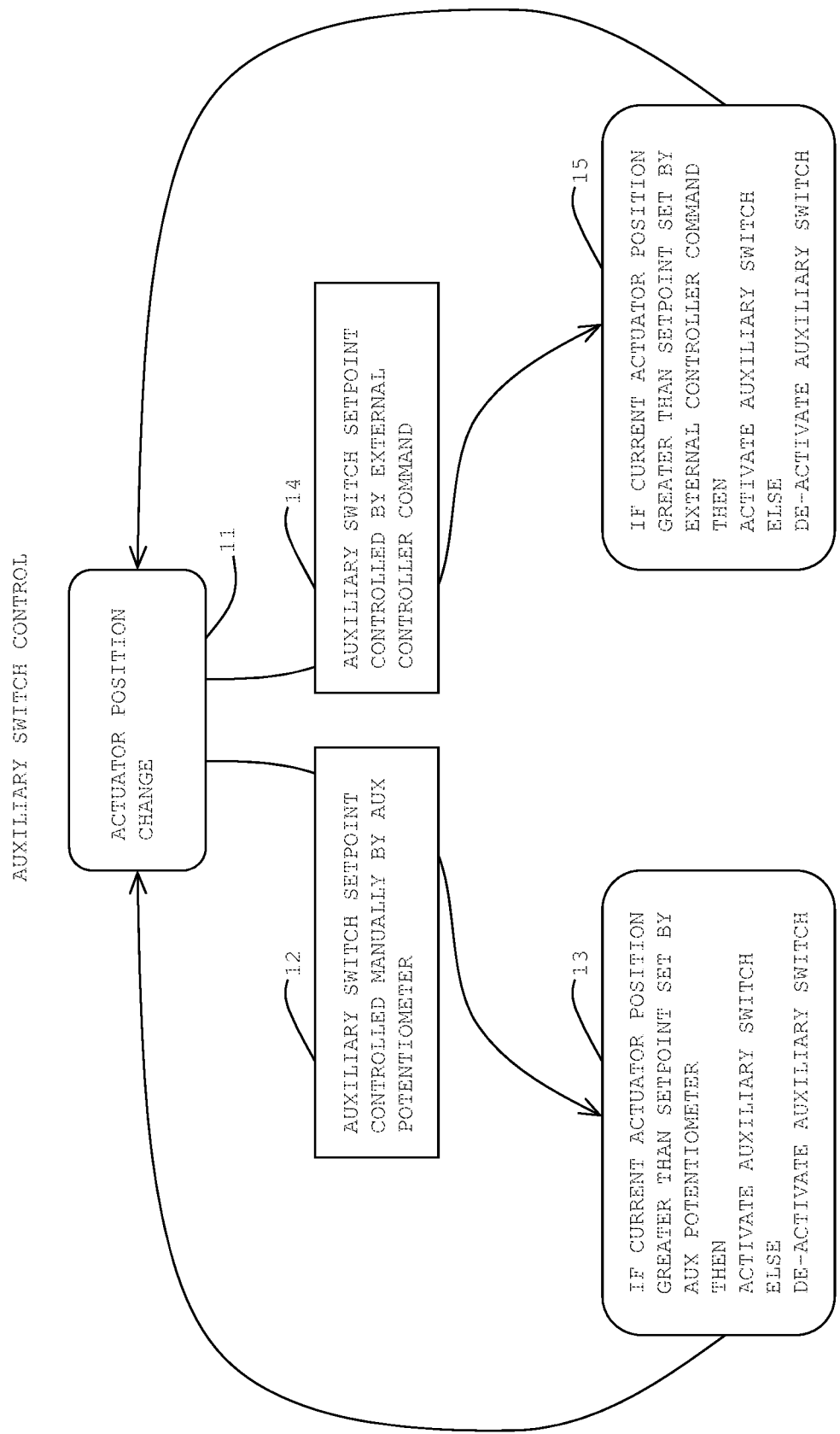
FIG. 5 is a diagram of an auxiliary switch setpoint control approach.

FIG. 5 is a diagram of an auxiliary switch control approach. Symbol 11 may indicate an auxiliary position change which may be initiated. An auxiliary switch setpoint may be controlled manually by an auxiliary potentiometer in symbol 12. Symbol 13 indicates that if the current actuator position is greater than the setpoint set by the auxiliary potentiometer, then the auxiliary switch may be activated. If not, then the auxiliary switch may be deactivated. Alternatively, in symbol 14, the auxiliary switch setpoint may be controlled by an external controller command. Symbol 15 indicates that if the current actuator position is greater than the setpoint set by an external controller command, then the auxiliary switch may be activated. If not, then the auxiliary switch may be deactivated.

A present communicating actuator may have a network adjustable running time. Applications in the field may require or benefit from different running time actuators. In the related art, different running time actuators might be purchased by model number, or programmable actuators may be programmed at commissioning using an independent tool. This situation may dictate that a person pick one running time for the actuator and application at the beginning of an implementation of the actuator.

An example of an issue of running time may occur during system checkout in an OEM factory or in the field. An OEM or field technician may prefer a fast running time (10 seconds) so that the actuator system can be checked out quickly without having to wait for a 90 second actuator to run its time.

The present approach may incorporate an actuator that allows programmable running time via the local bus. Over the bus, the actuator's running time may be programmed to different values at different times during the actuator's lifecycle. For example, the actuator may be programmed for 15 second timing during a test, 30 second timing during a normal application mode, and 90 second timing during a saver mode.

The present actuator approach may be applied in a Jade™ economizer/Sylk™ Zelix™ system implementation. The Sylk™ bus hardware may be implemented on the controller and the actuator. Then the firmware in these products may be created to implement the adjustable running time functionality.

Figure 6:
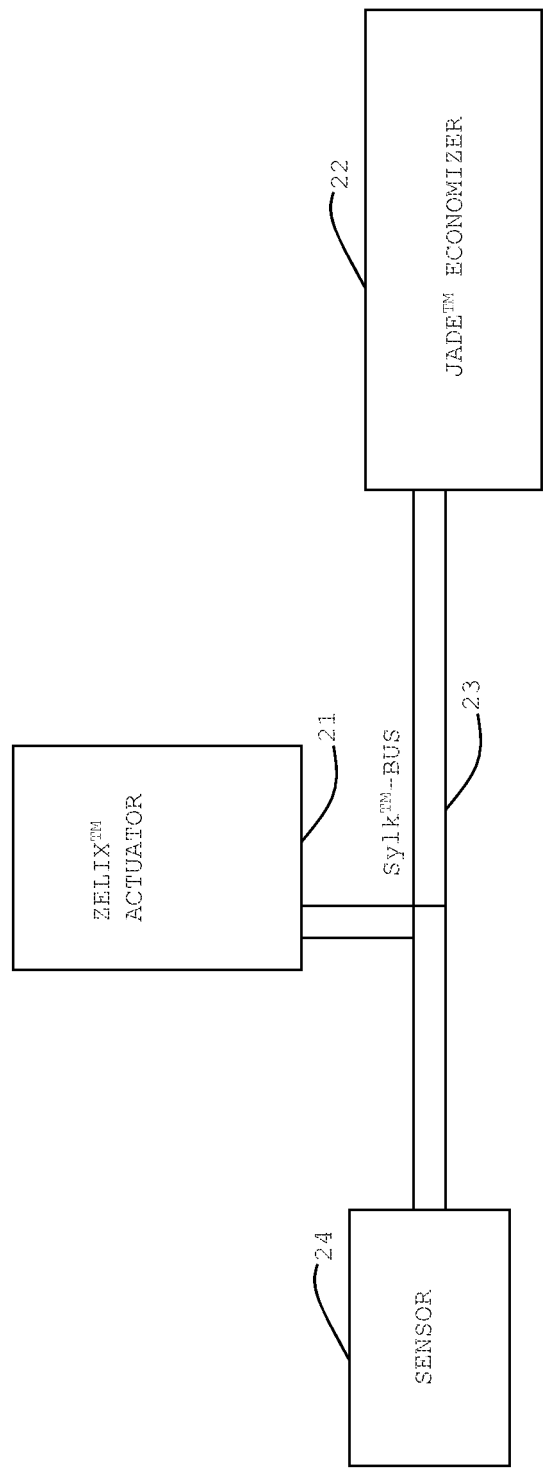
FIG. 6 is a diagram of an actuator, an economizer and sensor connected to one another via a bus.

FIG. 6 is a diagram of a Zelix™ actuator 21 with Jade economizer 22 connected to the actuator via a Sylk™ bus 23. A sensor 24 may be connected into the Sylk™ bus.

A present approach may incorporate a potentiometer address selection for an actuator. Setting a network address on a communicating actuator may be rather difficult. The actuator may be typically located in a hard to reach area (e.g., in a ceiling or behind equipment). Related art approaches may involve actuators that are typically small and hard to see and actuate (e.g., with dip switches/rotary encoders) and may use binary techniques as described herein which may require multiple microcontroller input pins.

The present approach may solve the issue by using a potentiometer to set and establish a network address on a communication actuator. The approach may allow for an address selector to be accessible from both sides of the actuator using a single potentiometer, the numbers and interface to be large and easy to read, and it may allow the address to be selected using only one analog input on the microcontroller.

Figure 7:
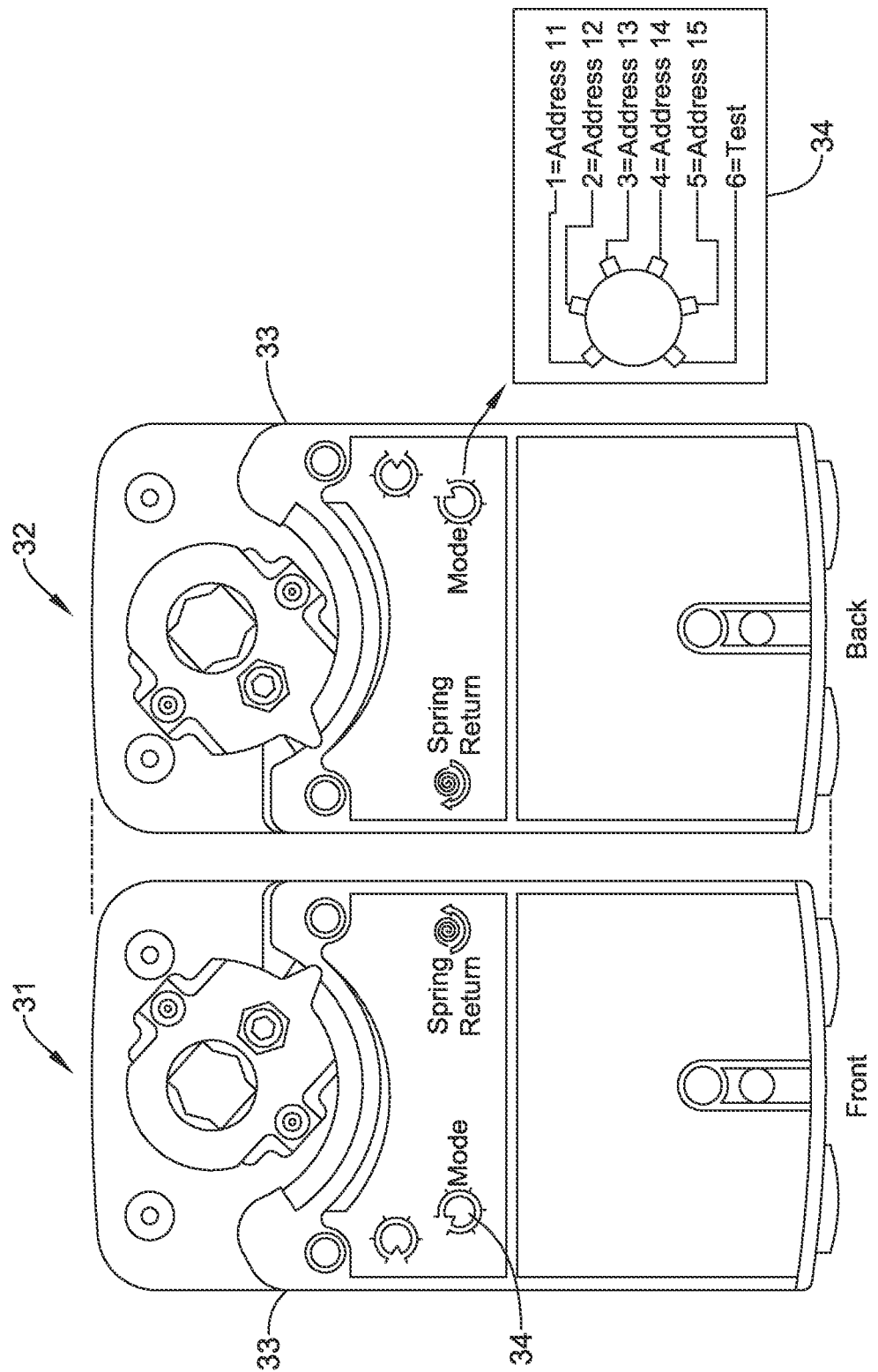
FIG. 7 is a diagram of front and back sides of an actuator revealing certain knobs for control and adjustment such as an address selector being accessible from both sides.

FIG. 7 is a diagram of a front view 31 of an actuator 33 and a back view 32 of the actuator. Certain knobs for control and adjustment such as an address selector 34 may be accessible from both sides of actuator 33. Selector 34 may have five positions for address selection. For instance, a position 1 may be for selecting an address 11, position 2 for address 12, position 3 for address 13, position 4 for address 14 and position 5 for address 15. A position 6 may be for selecting a test mode.

Figure 8:
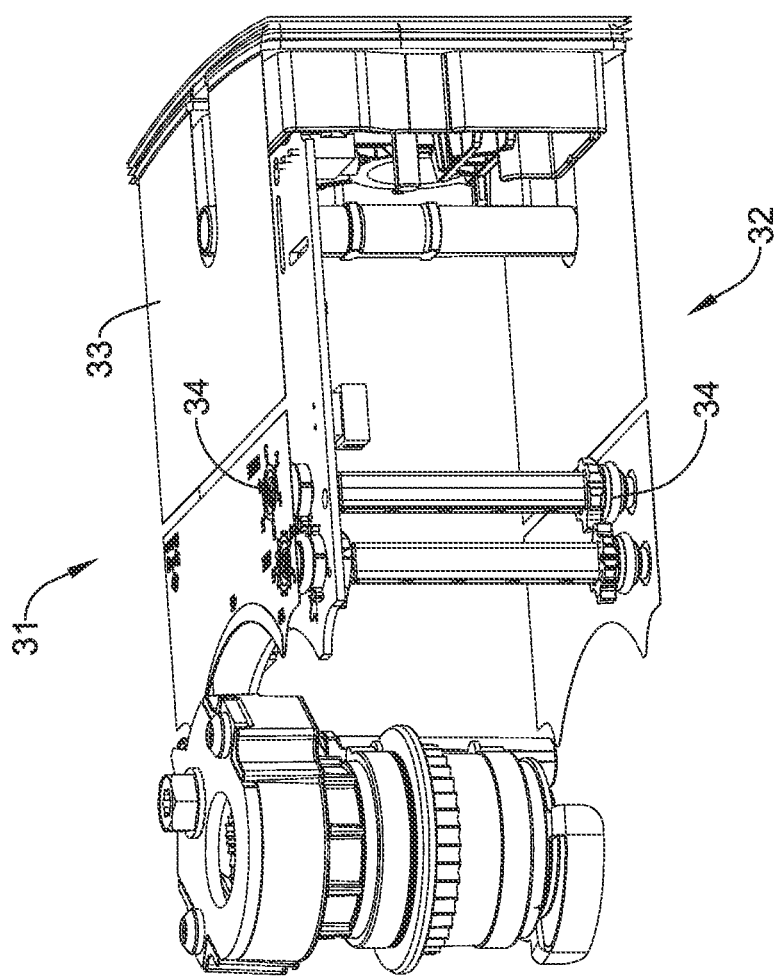
FIG. 8 is a diagram that shows perspective views of two sides of an actuator revealing the reversibility of actuator position for access to a selector from two sides of the actuator.

FIG. 8 is a diagram that shows perspective views of sides 31 and 32 of actuator 33 revealing the reversibility of the actuator for access to selector 34 from both sides of actuator 33.

The present approach may incorporate an actuator which has accessible onboard diagnostics. An issue in the related art may be that actuators in the field can fail or malfunction and of which many cases may be undetected. Such actuators may be wasting energy or giving up comfort for years before the failure is found.

The present approach may solve this issue by communicating alarms, status and diagnostics automatically over a bus. If an actuator fails, an alarm may be sent to the higher order controller for immediate notification. These software alarms and diagnostic features may be implemented in the firmware for a Sylk™ Zelix™ communicating actuator.

A controller or processor may provide on the communications bus one or more diagnostics items of a group consisting of high temperature warning, excessive noise on power line, record/report back electromotive force (EMF) on spring return, percentage of life detection, high amount of travel for given amount of time, hunting around a given point, actuator angle, communication normal indicator, stroke limiting, control valve (Cv) selection, flowrate on pressure independent control valve (PIC-V), set auxiliary switch, report auxiliary switch setting, report auxiliary switch status, report auxiliary switch current draw—auxiliary equipment status, if switch drives fan—verify fan shuts down before damper closes, if switch drives coils—verify heat exchanger running before opening/closing valve, report stuck valve/damper, PIC-V constant pressure—constant torque, changeover valve—no cycling for a period of time, time since last movement, date/time of first operation (commissioning), audible/detectable signal for location, device in warranty, device model number/serial number/date code, device type—outside air damper/standard ball valve/PIC-V valve/mixed air damper, actuator fitness/self-test routine—known system conditions, sensor—actual damper/valve position, super capacitor status, and energy consumption.

The present approach may incorporate an actuator test mode. There may be several approaches used by an actuator installer to verify that an actuator has been installed correctly. One approach may involve an operator at the control panel to cause the actuator to open and close. In another approach, the installer or maintainer may have access the connector and short the modulating input to cause the actuator to open, thus verifying that the actuator is working and connected properly.

With the test mode, there may be a test mode selection on a pot or switch that causes the actuator to move to its open position. An installer or maintainer may then just select Test Mode via the pot and verify an operation of the actuator without needing to access the connector or to communicate with a control operator.

Actuator software may verify that the test mode has been selected on the switch or potentiometer. The software may then exercise the following algorithm.

IF Test Mode THEN
Set actuator speed to maximum allowable speed
Cause actuator to open (move to end of its allowable span)
Remain in this position while in Test Mode.

Figure 9:
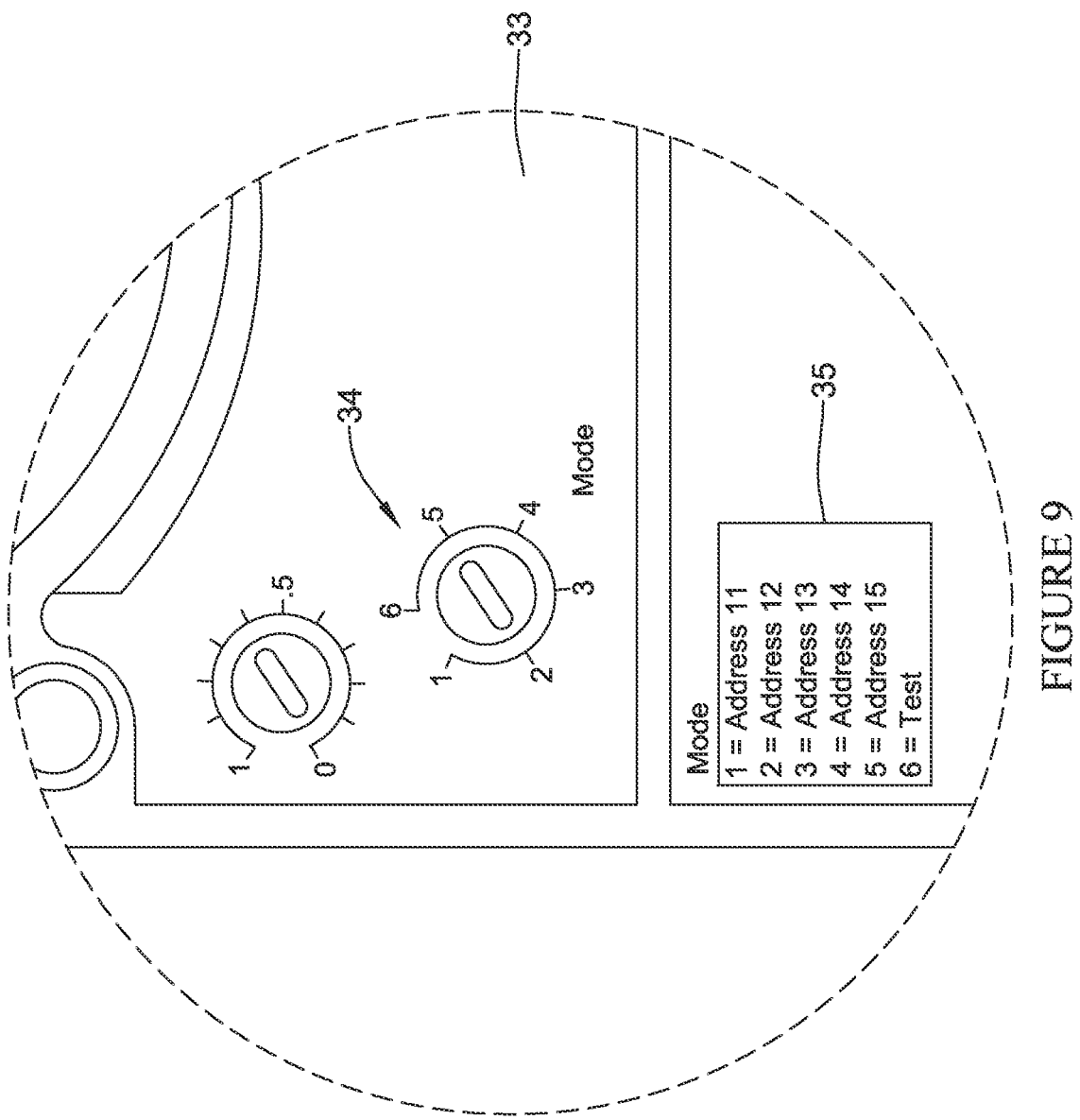
FIG. 9 is a diagram of a close view of a selector or mode switch showing positions available for a test mode and addresses of an actuator.

FIG. 9 is a diagram of a closer view of the selector or mode switch 34, showing 6 positions available for the test mode of actuator 33. A mode plate 35 indicates that position 6 may be designated for "Test" or test mode. Positions 1-5 indicate five different addresses available for selection by switch 34.

Figure 10:
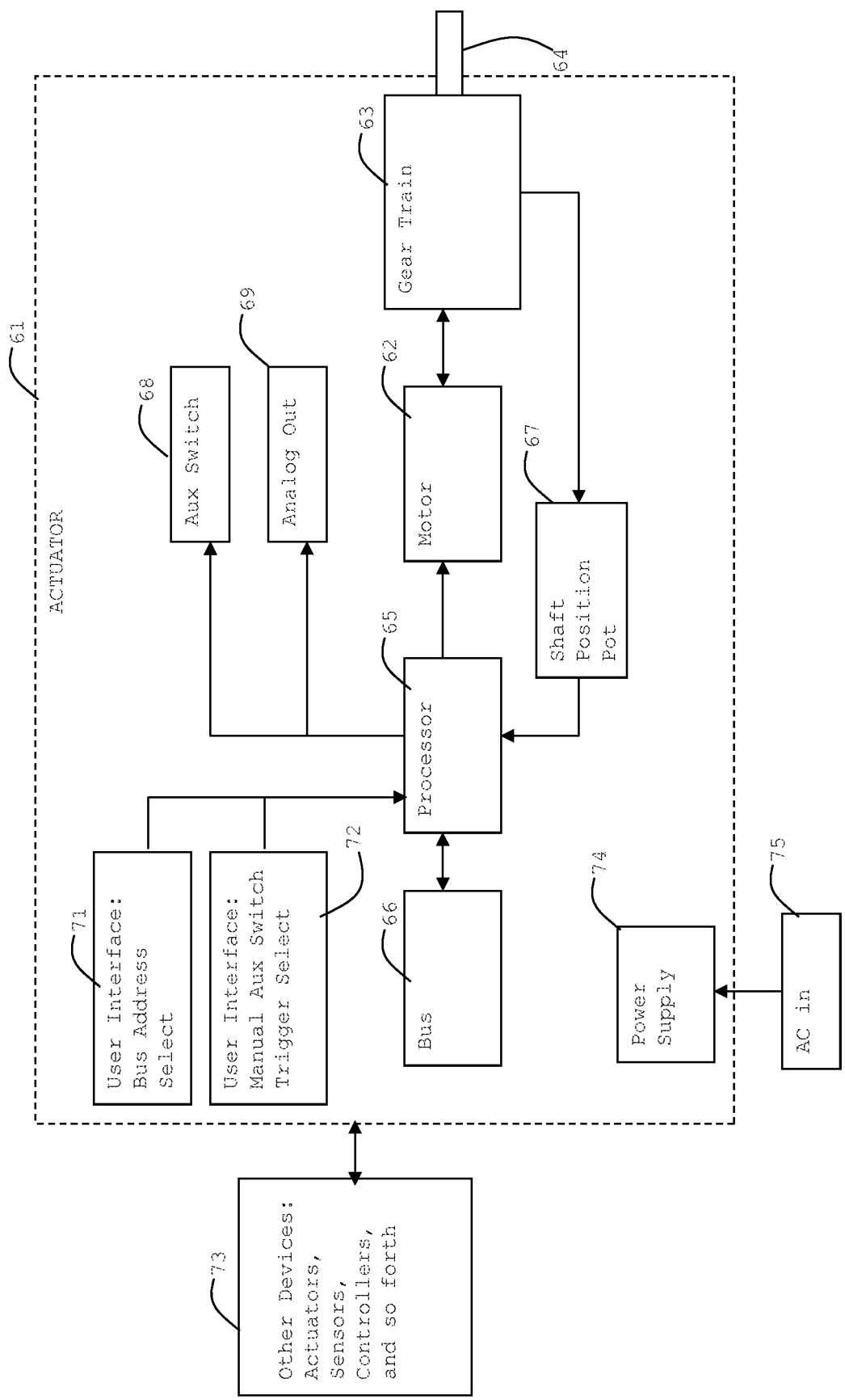
FIG. 10 is a diagram of a two-wire polarity-insensitive bus controlled actuator.

FIG. 10 is a diagram of a two-wire polarity-insensitive bus (i.e., Sylk™) controlled actuator 61. An electric motor 62 may drive a gear train 63 which turns an actuator shaft 64 which may move a damper, valve, or other component. A processor 65 may be connected to motor 62 and provide control of the motor. Motor 62 may instead be some other electromagnetic mover. Processor 65 may also be connected to a communications bus 66. A shaft position potentiometer 67 may be mechanically connected to the actuator shaft 64 or a part on the gear train to electrically provide a position of shaft 64 to processor 65. An auxiliary switch output 68 and an analog output 69 may be provided by processor 65. A user interface 71 may provide a bus address select to processor 65. A user interface 72 may provide a manual auxiliary switch trigger select. Actuator 61 may be connected to other devices 73 such as actuators, sensors, controllers, and so on. Actuator 61 may have a power supply 74 to power its components. An AC power line 75 or other source may provide power to supply 74.

Figure 11:
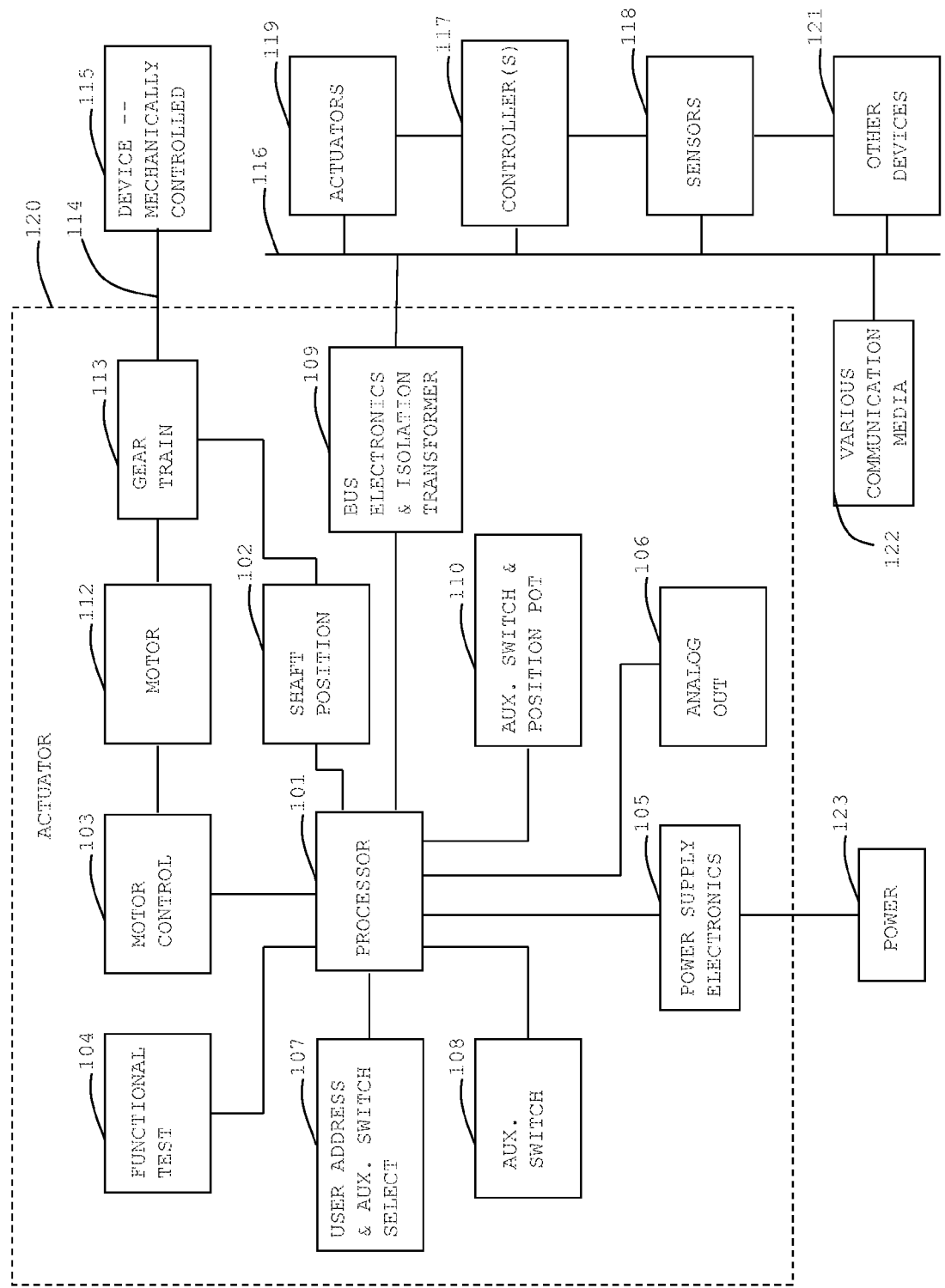
FIG. 11 is diagram of another layout of another actuator.

FIG. 11 is a diagram of an actuator 120. Many components of actuator 120 are revealed in the diagrams shown in FIGS. 12a through 12r. Interconnections of the components may be indicated in the diagrams as identified by various connections and wires having labels and alphanumeric symbols. For example, a line identified as A1 in FIG. 12a may be connected to a line identified as A1 in FIG. 12b. A processor 101 may be connected to power supply electronics 105, bus electronics and isolation transformer 109, a motor control 103 and a shaft position indicator 102. Processor 101 may also be connected to an auxiliary switch 108, an auxiliary switch and position potentiometer 110, and a user address and auxiliary switch selector 107. Further, processor 101 may be connected to an analog out 106 and functional test electronics 104.

A motor 112 may be connected to motor control 103. An output of motor 112 may be mechanically connected to a gear reduction train 113. Gear train 113 may have an actuator coupling or shaft 114 for connection to a mechanically controlled or operated device 115 such as, for example, a damper, valve, flap, louver, and so on. Gear train 113 may be connected to shaft position indicator 102.

Bus electronics and isolation transformer 109 may be connected to a communications bus 116. Outside actuator 120, bus 116 may be connected to controllers 117, sensors 118, actuators 119, and other devices 121 and various communication media 122. An outside power source 123 may be connected to power supply electronics.

Figure 12A:
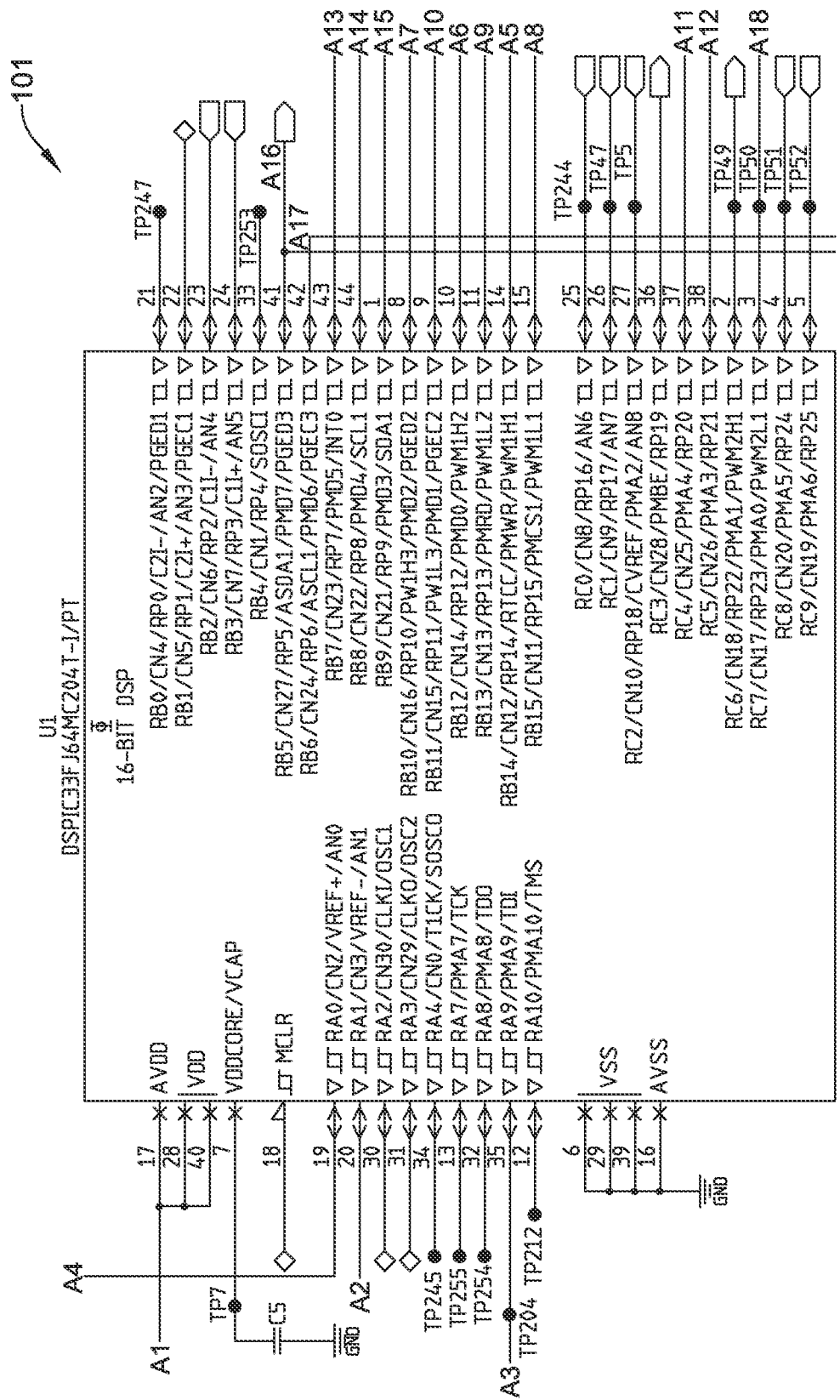
FIGS. 12a through 12r are schematics of circuitry for the actuator as represented by FIG. 11.
Figure 12B:
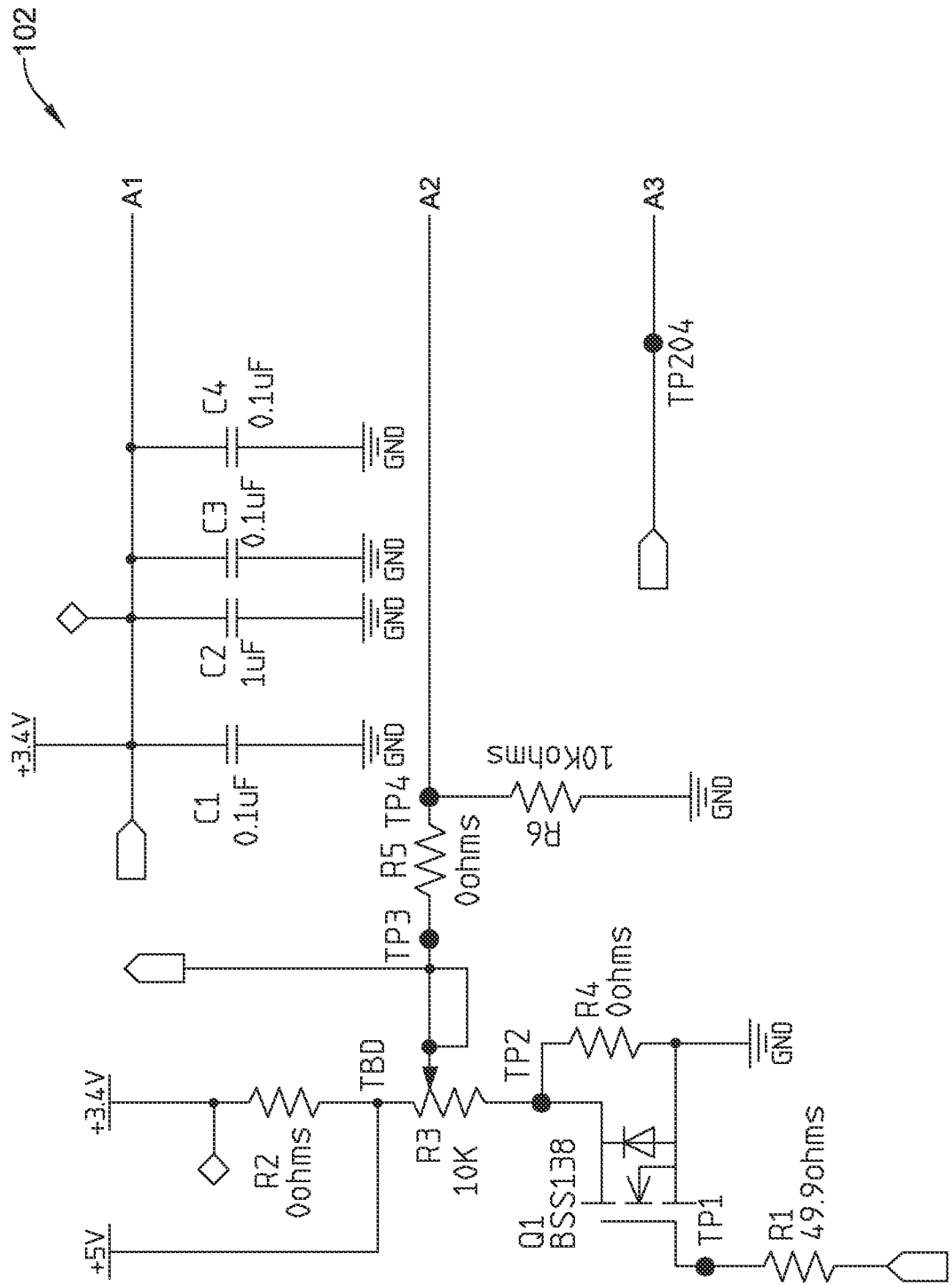
Figure 12C:
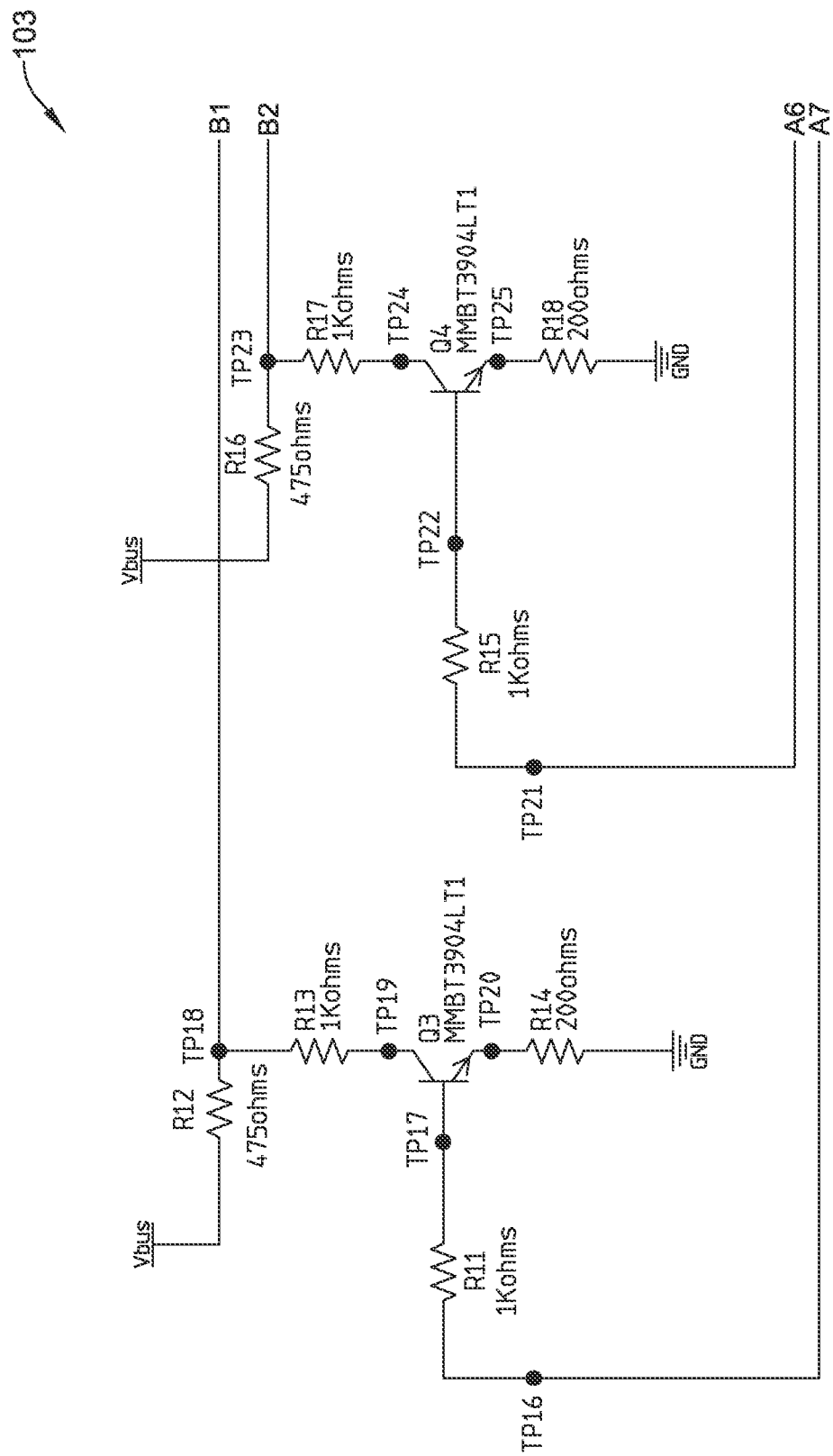
Figure 12D:
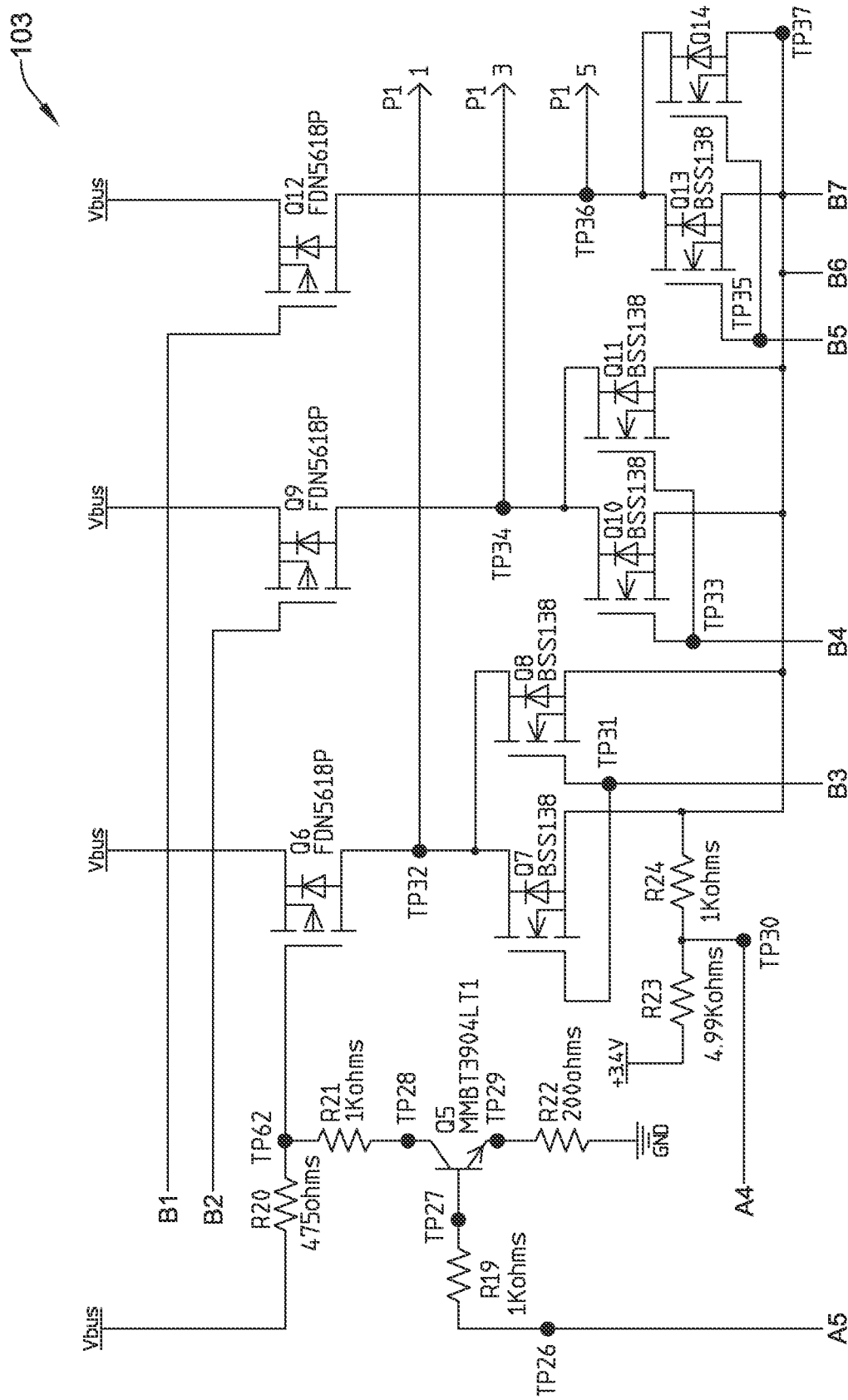
Figure 12E:
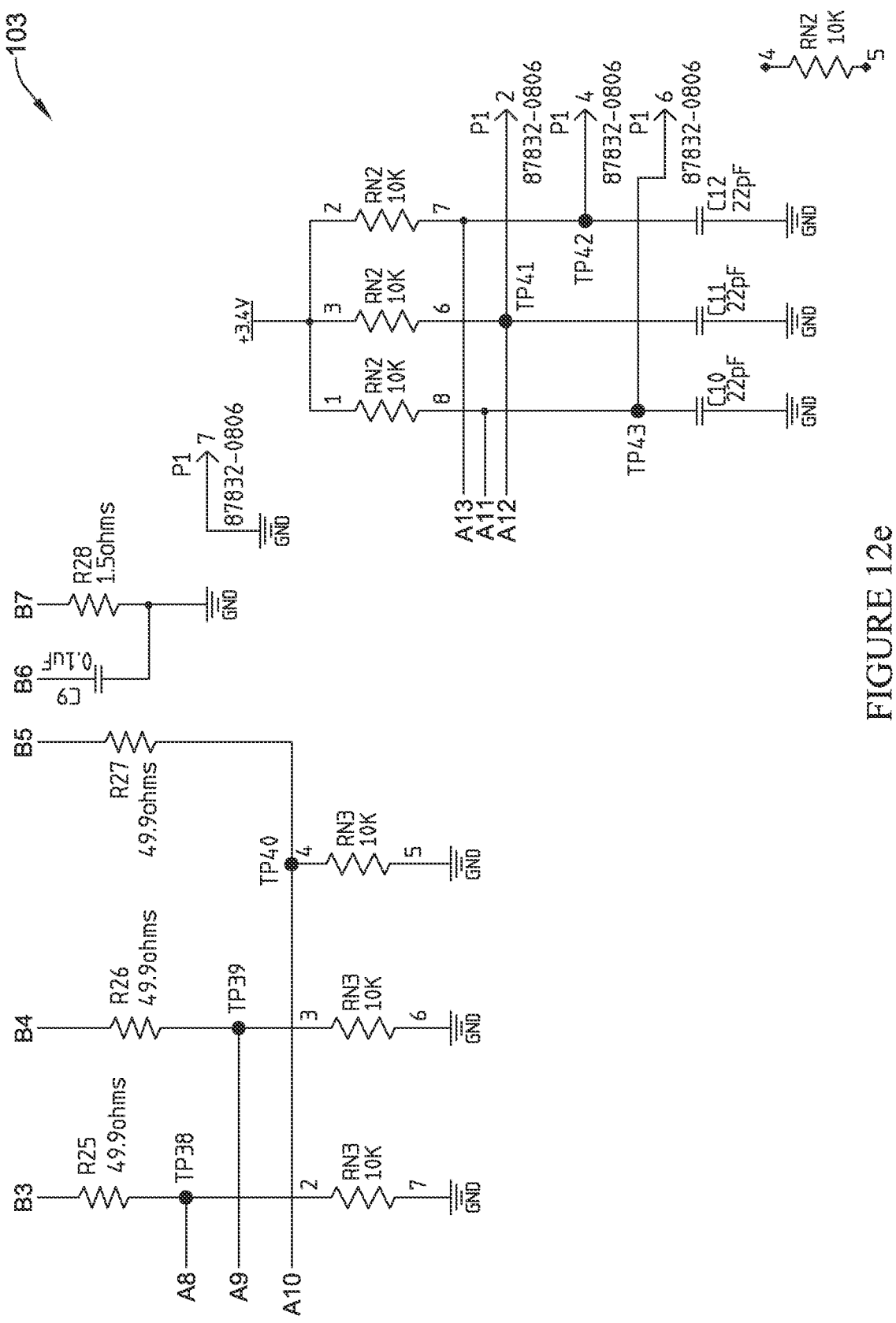
Figure 12F:
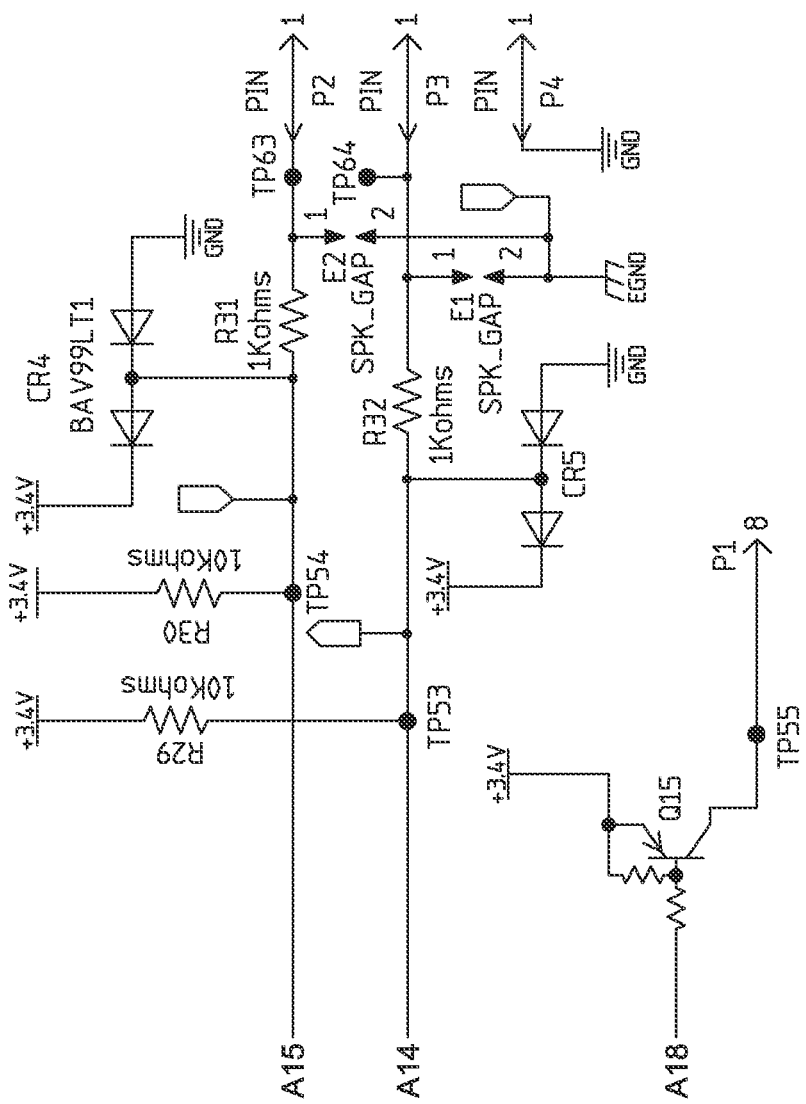
Figure 12G:
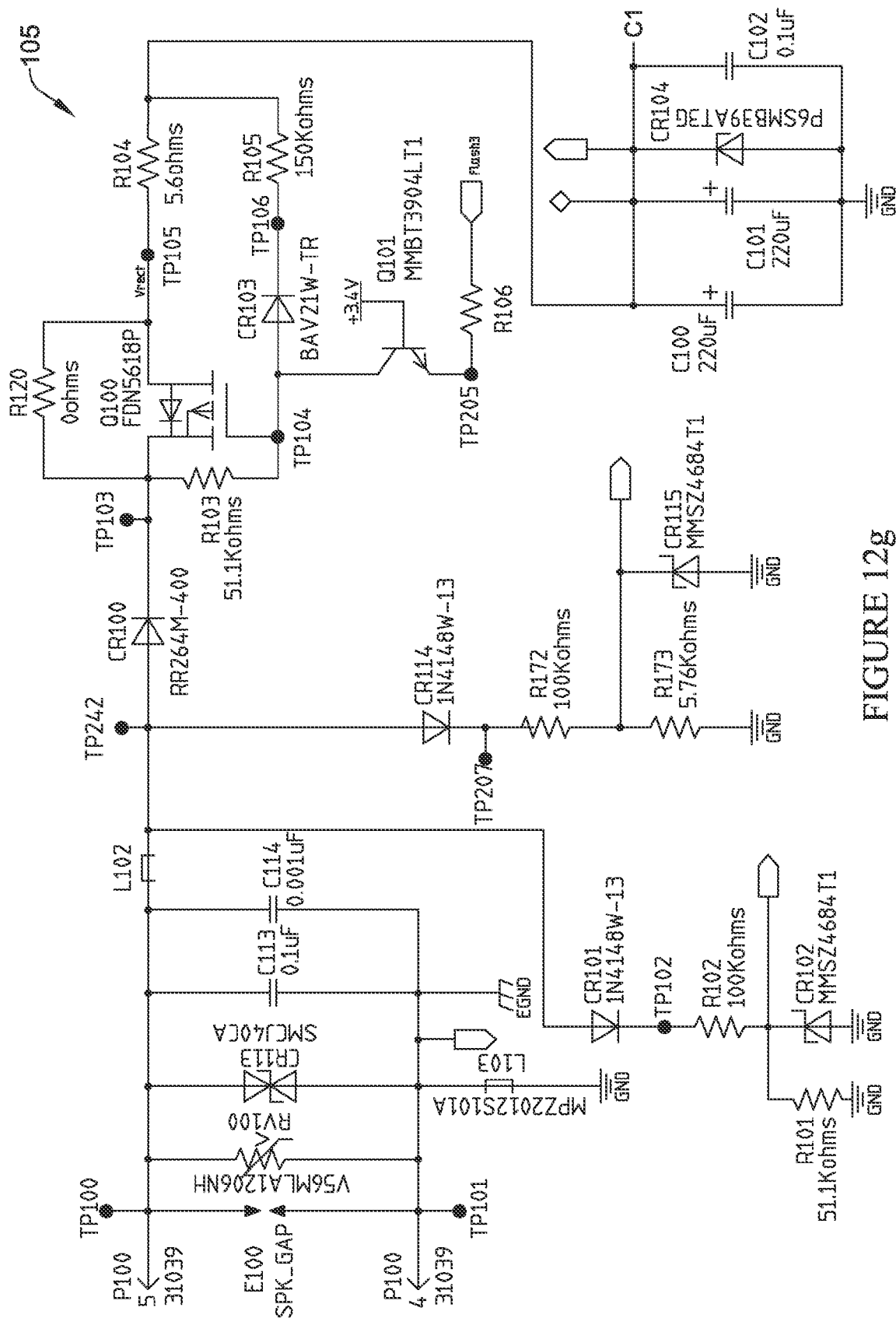
Figure 12H:
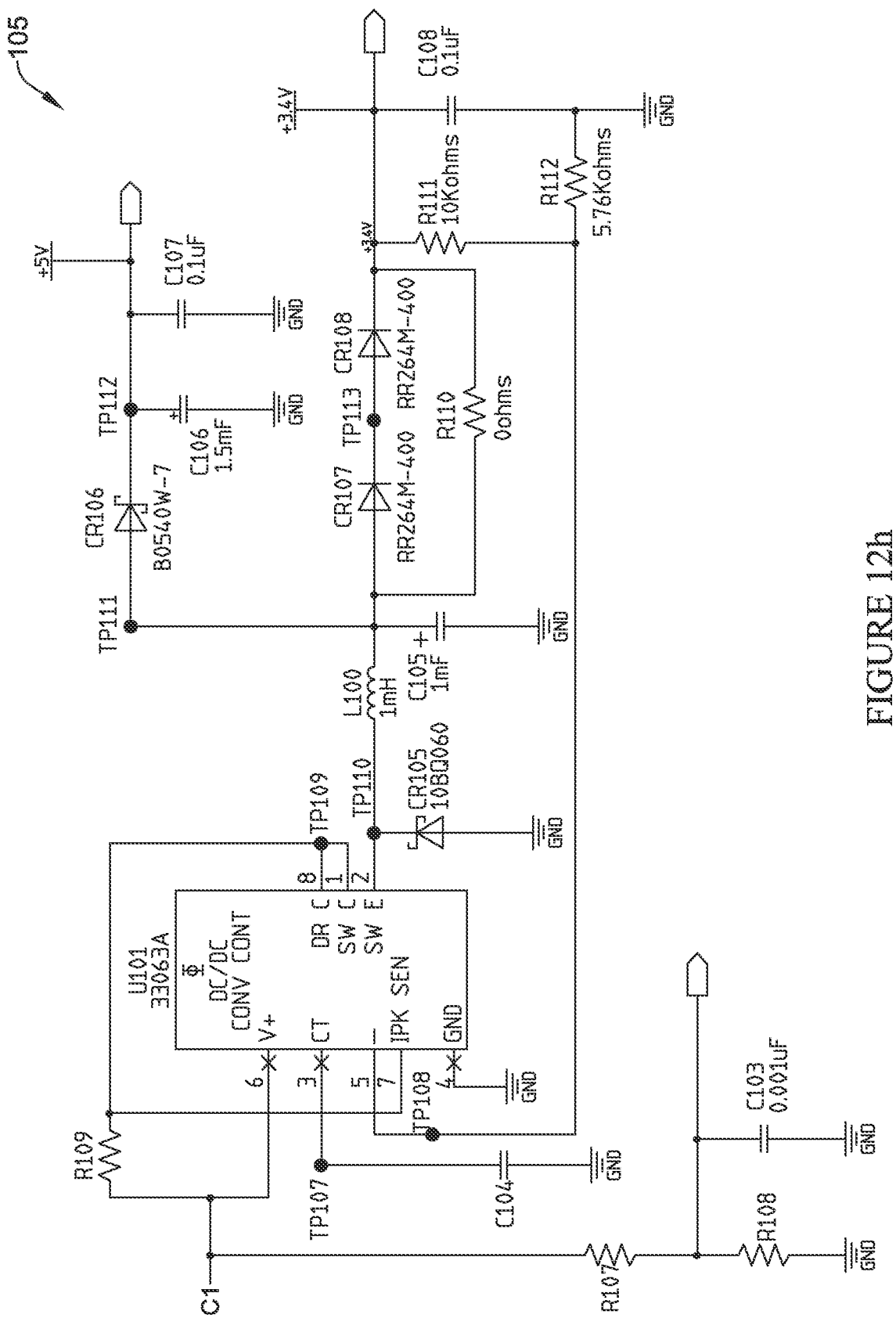
Figure 12I:
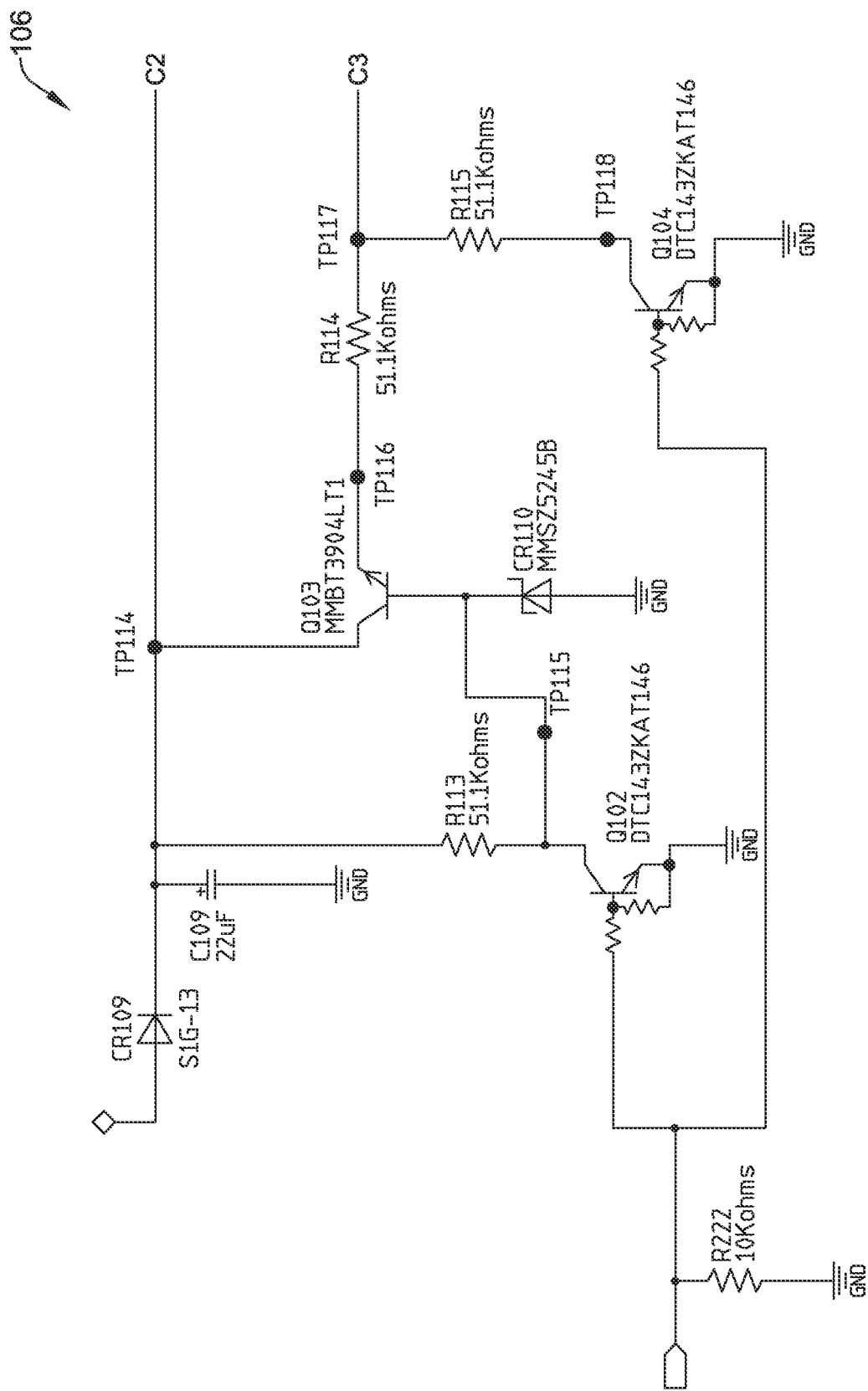
Figure 12J:
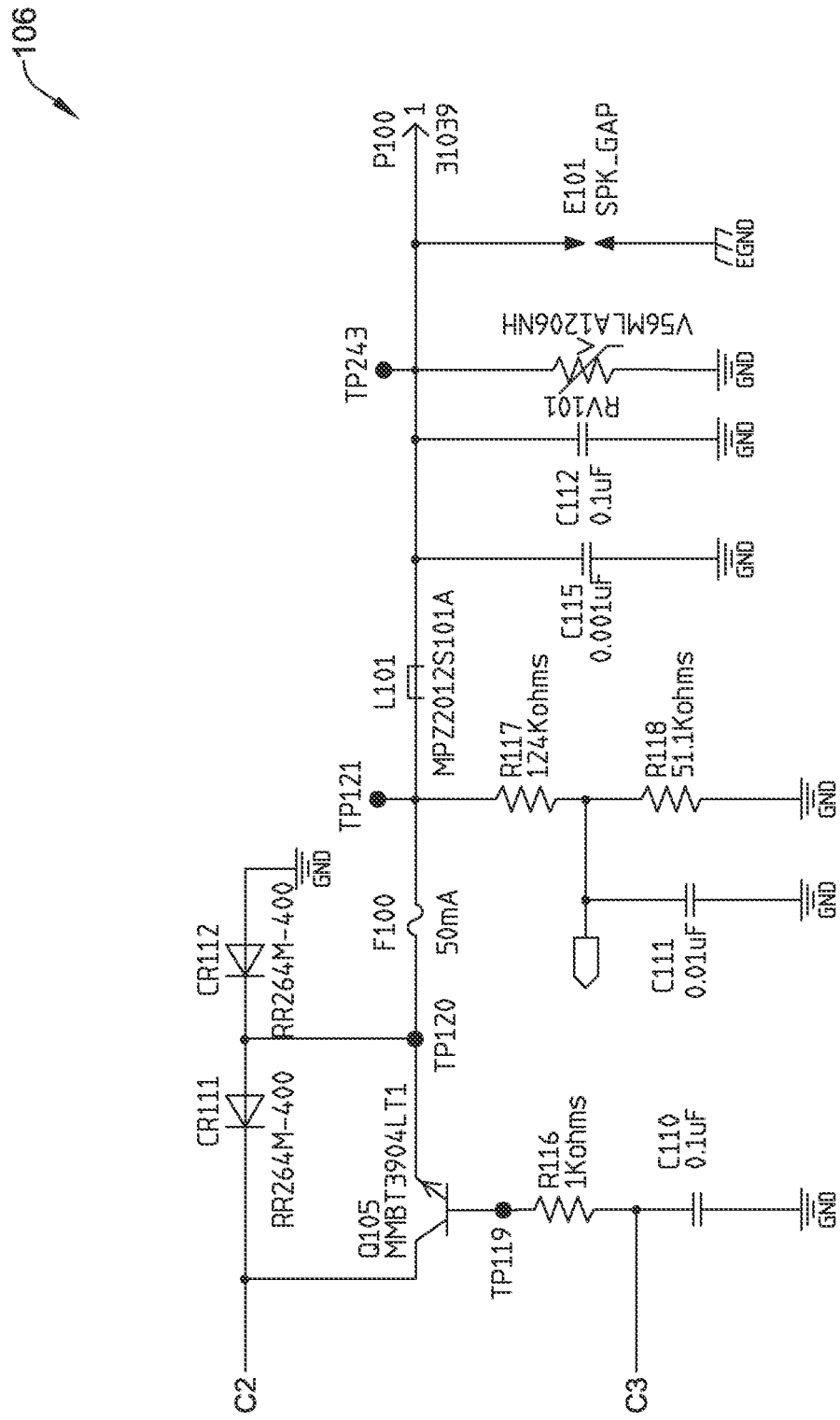
Figure 12K:
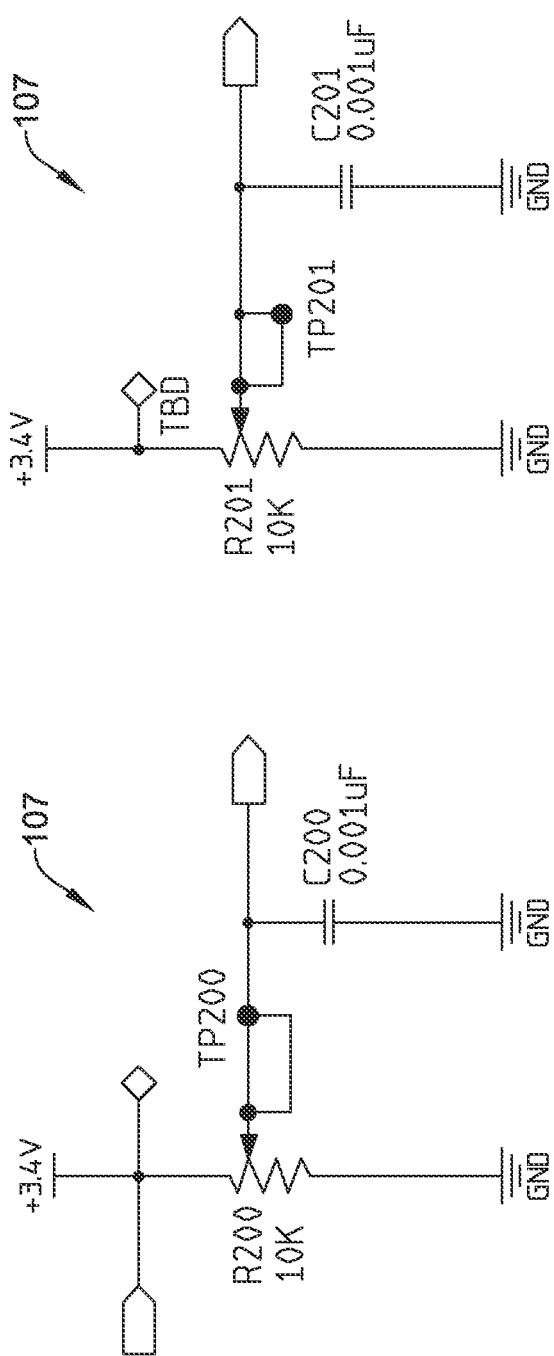
Figure 121:
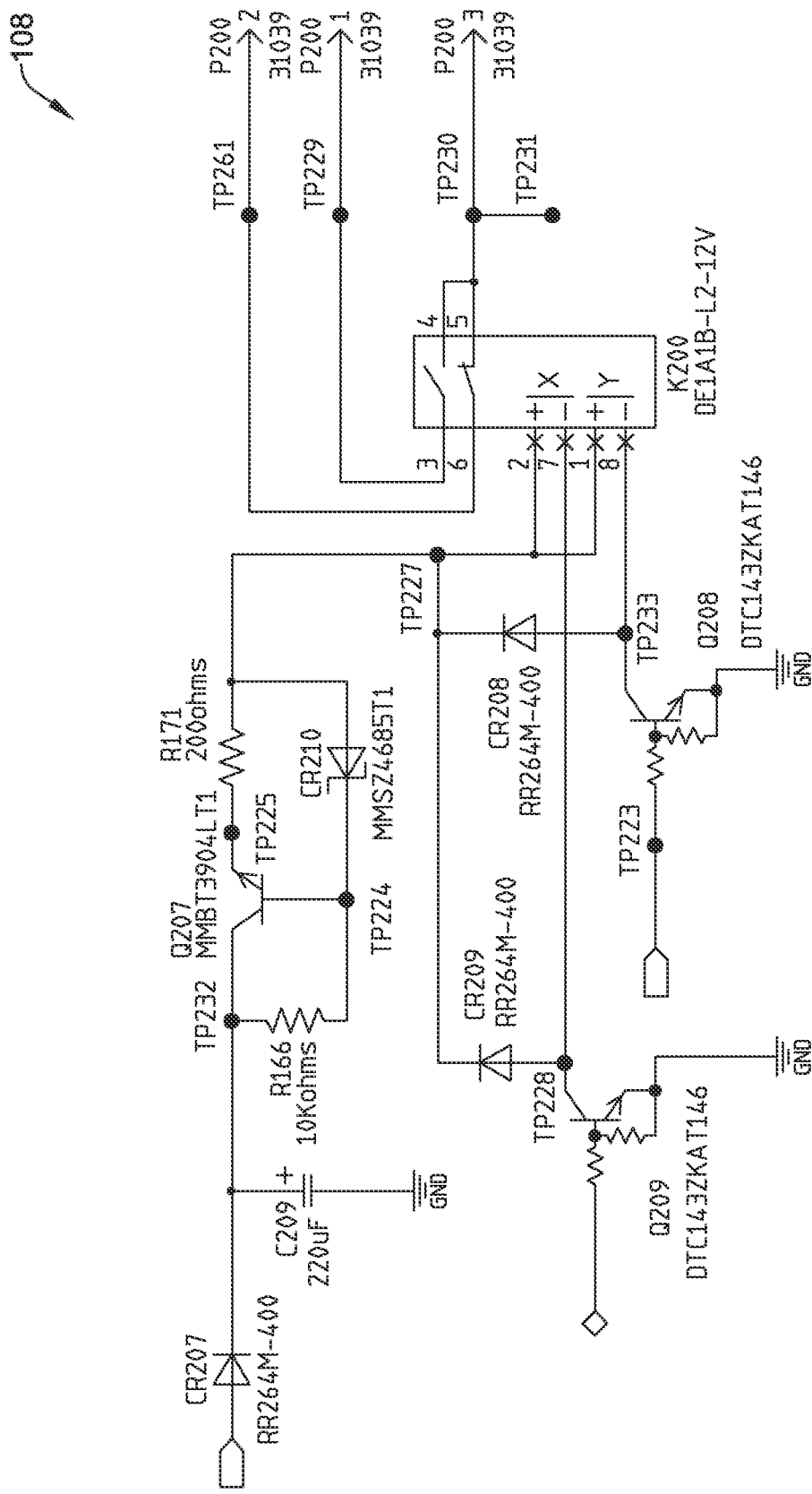
Figure 12M:
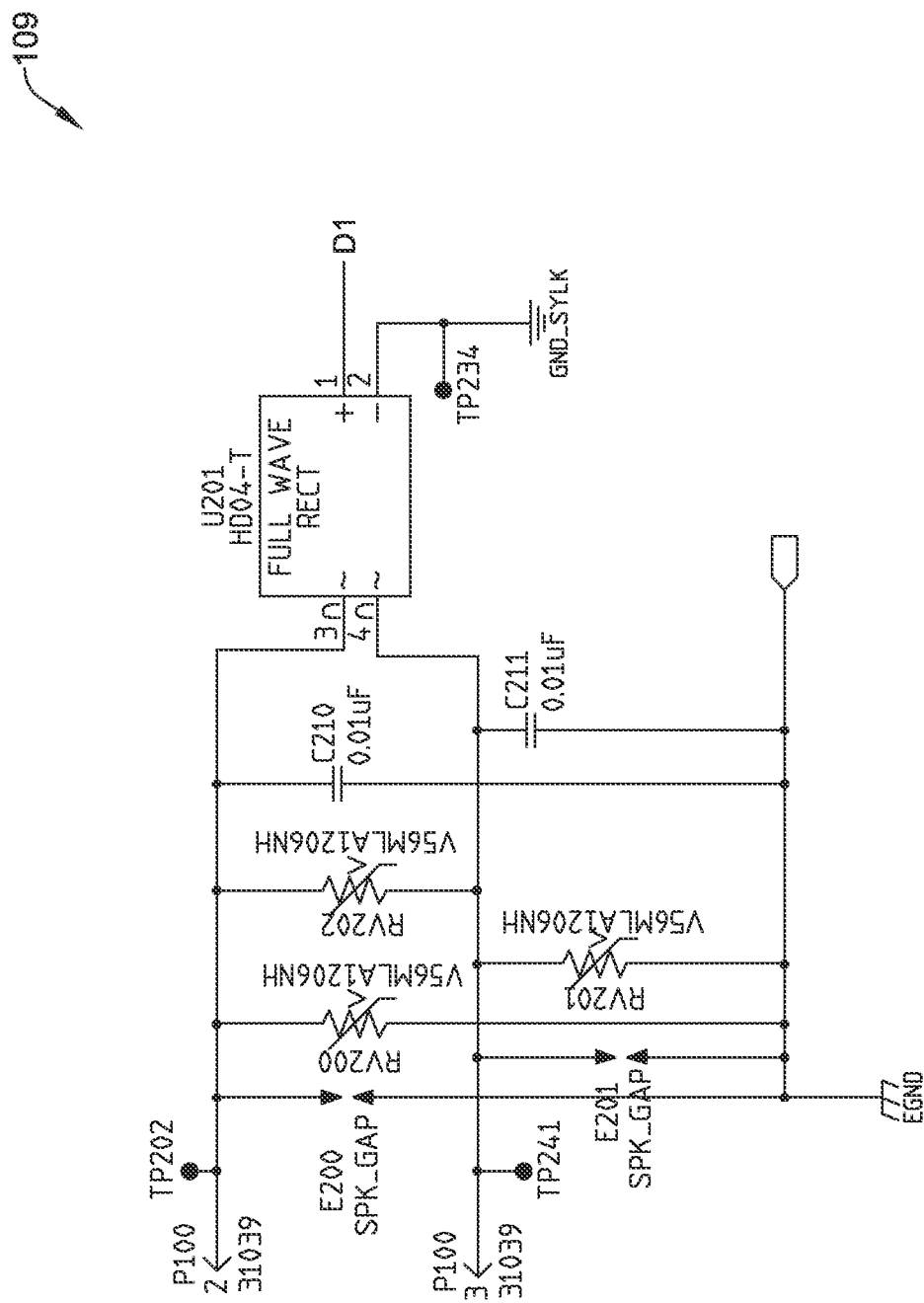
Figure 12N:
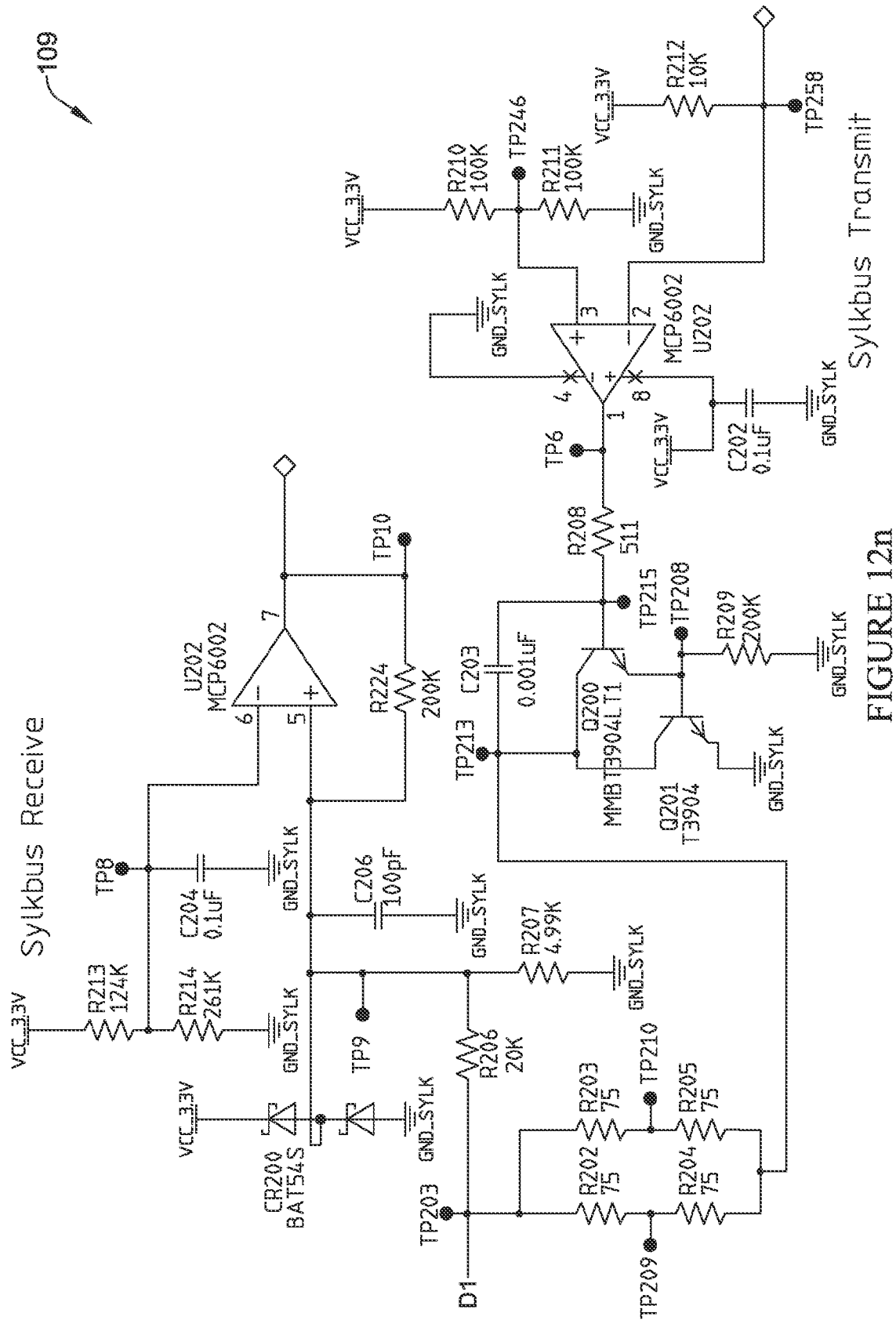
Figure 12O:
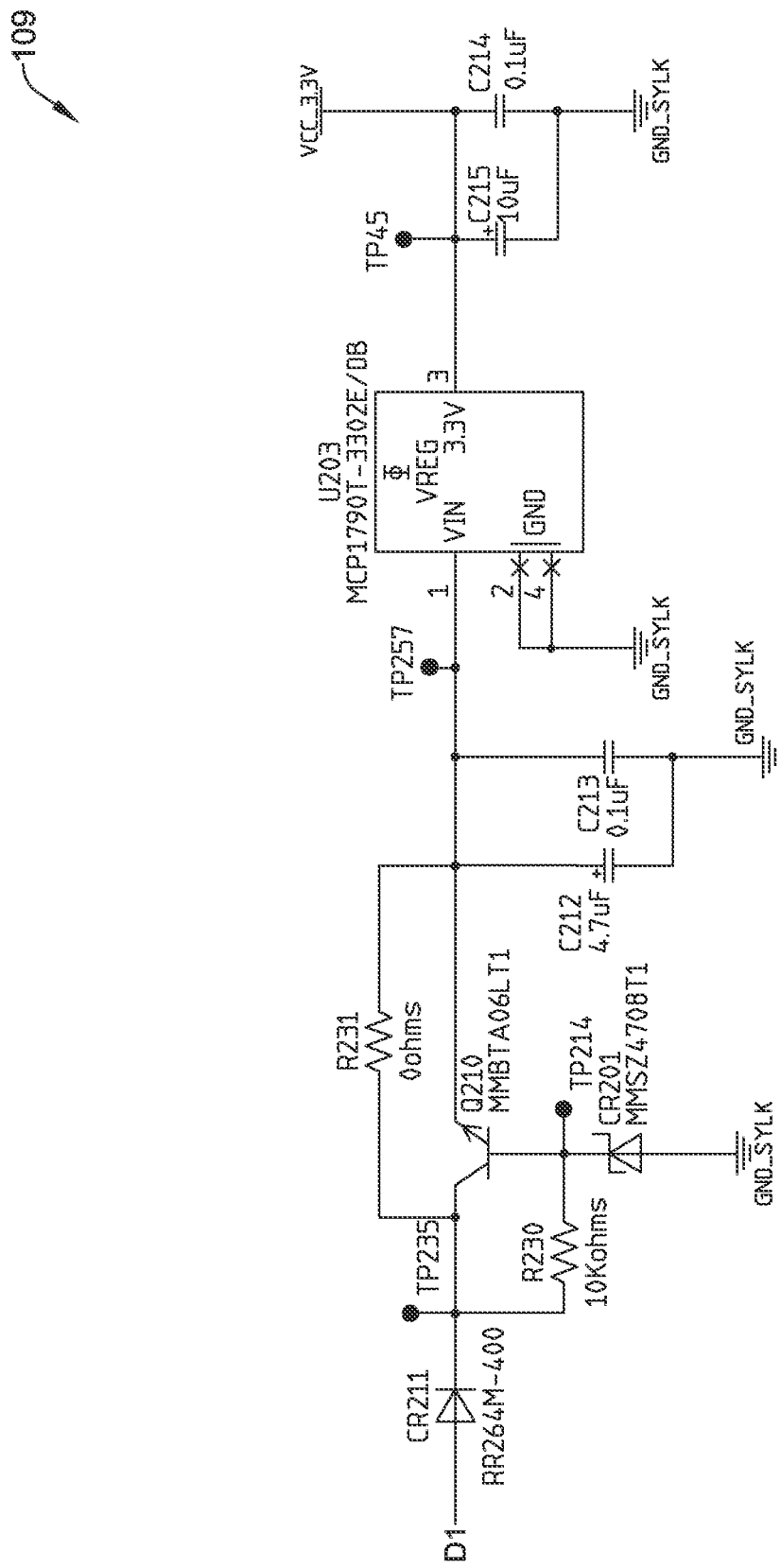
Figure 12P:
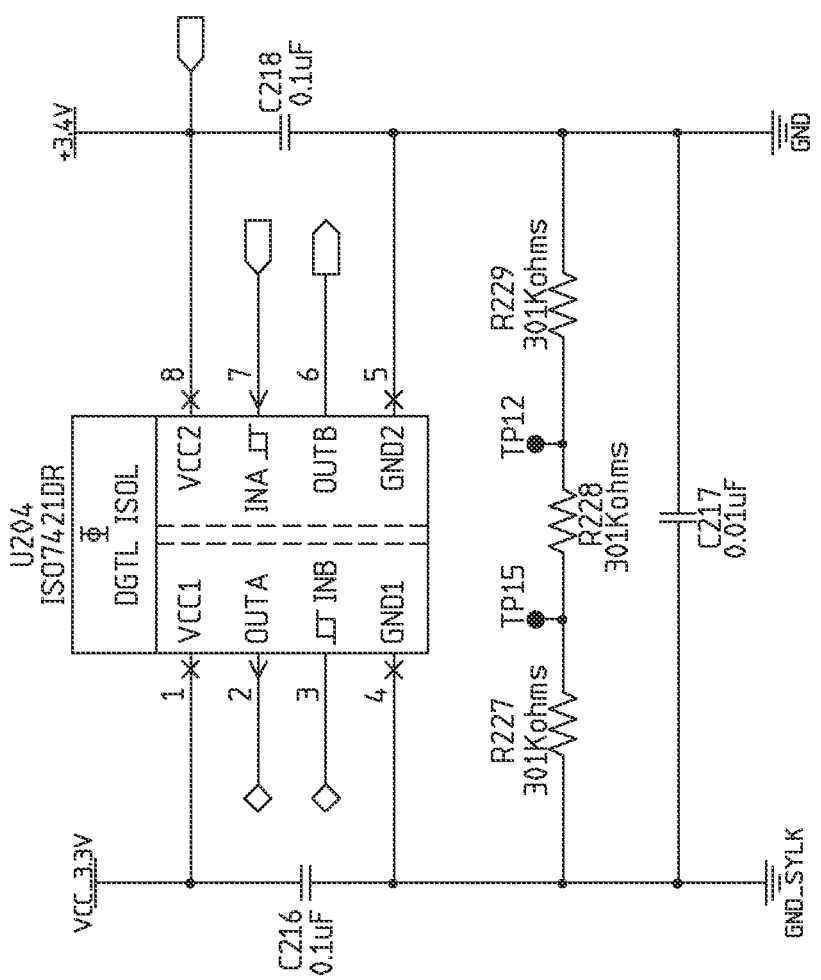
Figure 12Q:
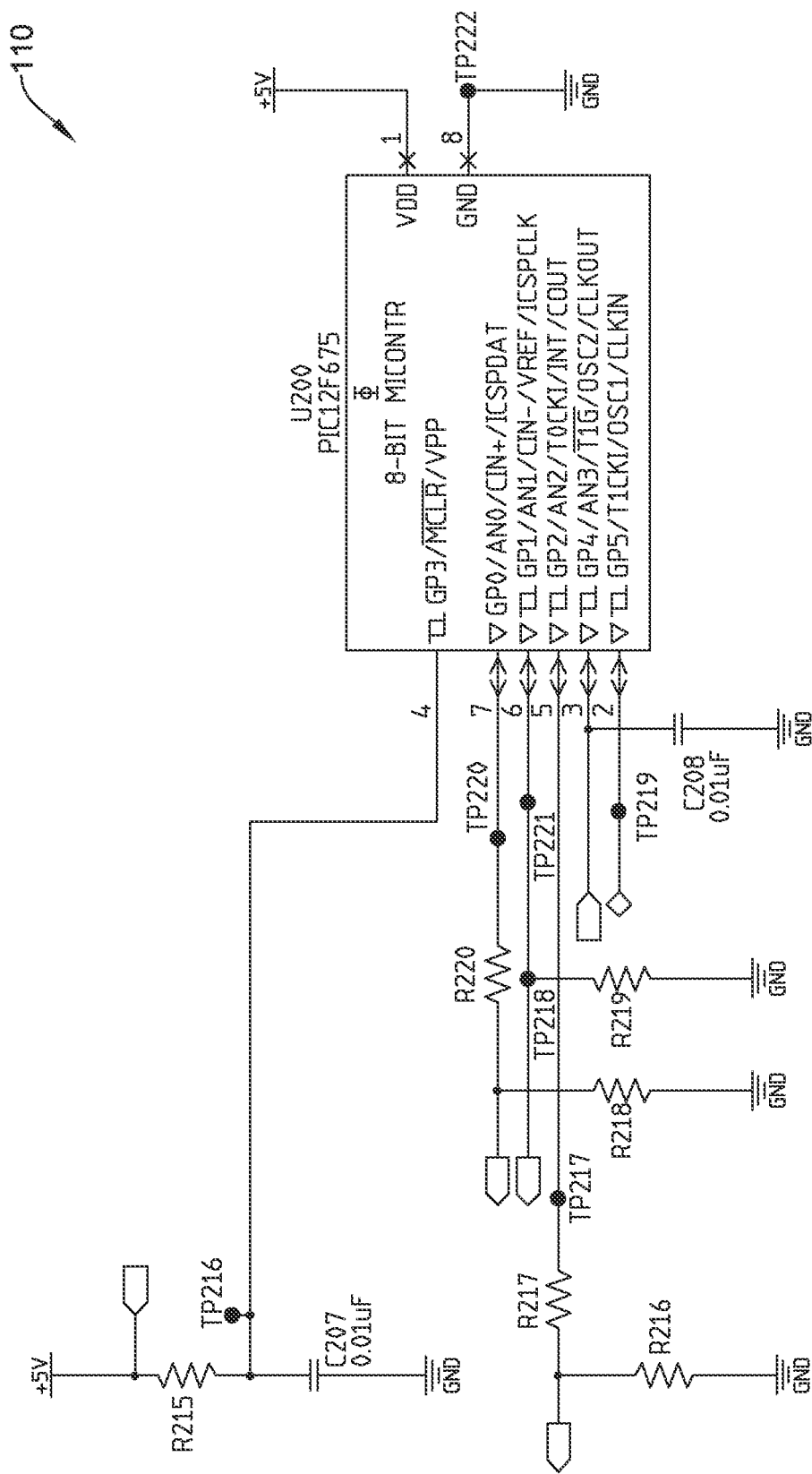
Figure 12R:
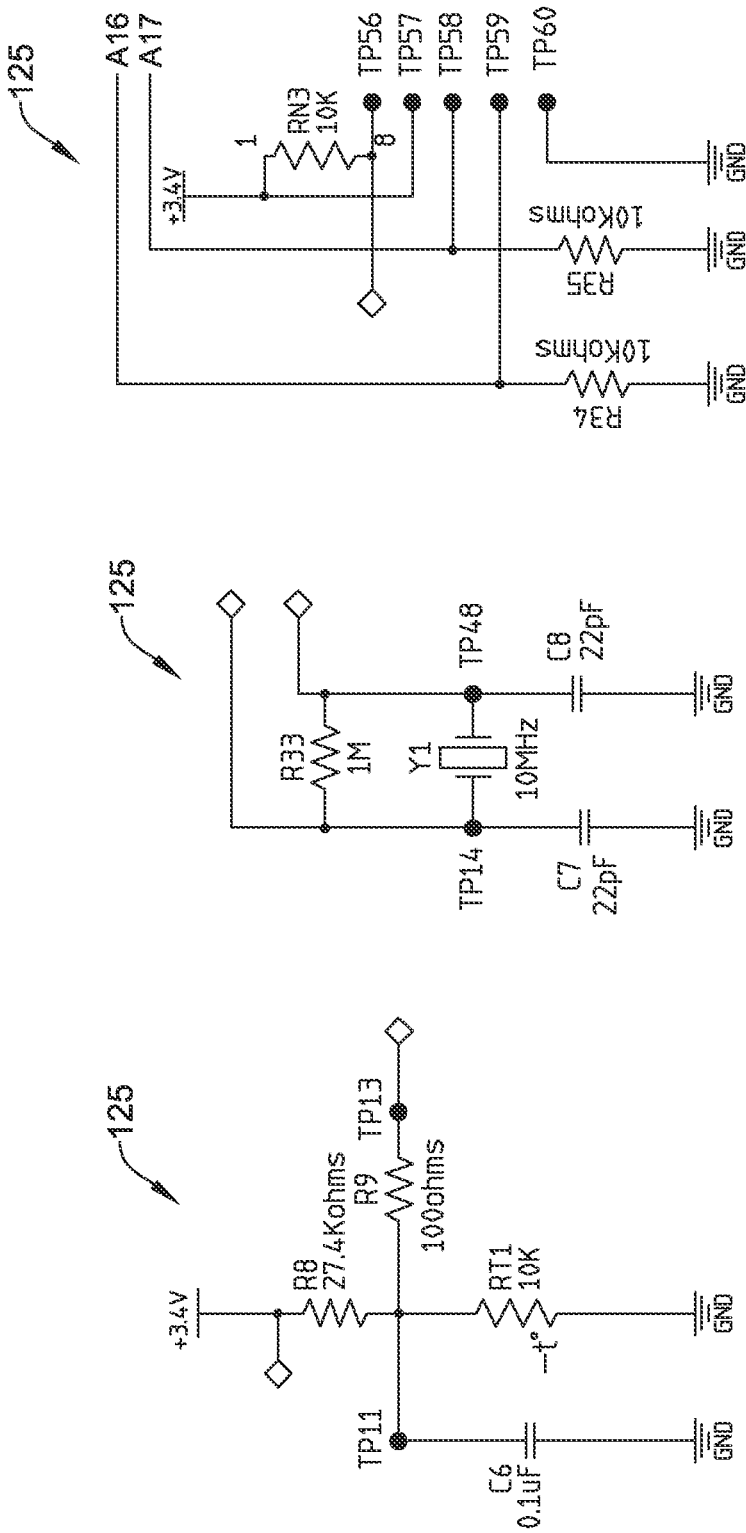

Processor 101 may be shown in a diagram of FIG. 12a. Shaft position indicator 102 may be shown in a diagram of FIG. 12b. Motor control 103 may be shown in diagrams of FIGS. 12c, 12d and 12e. Functional test electronics may be shown in a diagram of FIG. 12f. Power supply electronics may be shown in diagrams of FIGS. 12g and 10h. Analog out electronics 106 may be shown in diagrams of FIGS. 12i and 12j. User address and auxiliary switch circuitry 107 may be shown in diagrams of FIG. 12k. Auxiliary switch circuitry 108 may be shown in a diagram of FIG. 12l. Communications bus electronics 109 may be shown in diagrams of FIGS. 12m, 12n, 12o and 12p. Auxiliary switch and position potentiometer circuitry 110 may be shown in a diagram of FIG. 12q. Miscellaneous circuitry 125, such as thermistor, oscillator and flash electronics may be in diagrams of FIG. 12r. Some of the other Figures noted herein may show diagrams of other portions of circuitry helpful in building the actuator system.

To recap, an actuator system for a heating, ventilating and air conditioning (HVAC) setup, may incorporate an electromechanical mover, a processor connected to the electromechanical mover, and a first potentiometer, having a set of directions of control and a plurality of ranges for addresses, connected to the processor, a second potentiometer having a plurality of addresses connected to the processor, and a housing that encloses the actuator. Access to the potentiometers for selecting or changing an address for the actuator may be available on at least two sides of the housing. The at least two sides of the housing may reveal visible indications and physical features for selecting or changing an address for the actuator on the potentiometers.

An address for the actuator may incorporate a direction of control selected from the set of directions of control on the first potentiometer, a range of addresses selected from the plurality of ranges on the first potentiometer, and an address selected from the plurality of addresses on the second potentiometer within the range of addresses selected from the plurality of ranges for addresses.

The actuator may be connected to a communications bus. The address for the actuator may be an address of the actuator used on the communications bus.

The actuator system may further incorporate one or more additional actuators connected to the communications bus. Each actuator may have an address which is different from an address of the other one or more additional actuators connected to the communications bus.

If the actuator is substituted with a replacement actuator, then an address for the replacement actuator may be selected or changed via first and second potentiometers of the replacement actuator to be the same as the address of the actuator being replaced.

The actuator system may further incorporate a controller connected to the communications bus. The communications bus may have two polarity-insensitive wires.

The controller may override a setting of the plurality of settings of the potentiometers which is a selection of an address for the actuator and can select another or the same address for the actuator via the communications bus.

An address may define an actuator in terms of one or more items of a group consisting of an activation program, actuator stroke speeds, one or more sensor outputs, input/output requirements, a slot assignment on the communications bus, one or more parameters of the actuator, and a sensor prioritization.

An approach for establishing an address for an actuator in a heating, ventilating and air conditioning (HVAC) system, may incorporate providing an address for an HVAC actuator on a communications bus by providing an input to the processor, connecting the processor to an electromagnetic mover, and connecting the electromagnetic mover to an HVAC actuator shaft coupling. The input to the processor may have an address for the HVAC actuator provided by selections made on first and second potentiometers. The first and second potentiometers may have a plurality of selections for providing inputs to the processor.

An address for the actuator may incorporate a selection of a direction of control from the set of directions of control, a range of addresses from the plurality of ranges on the first potentiometer, and an address from the plurality of addresses on the second potentiometer. The inputs may have different addresses for the actuator on the communications bus. The actuator shaft coupling may mechanically operate an apparatus in an HVAC system.

The approach may further incorporate enclosing the processor, the electromagnetic mover, and the first and second potentiometers in a housing. The housing may provide access to the first and second potentiometers for selecting the address for the actuator at two or more sides on the housing. The approach may further incorporate replacing the actuator with a second HVAC actuator, and setting the first and second potentiometers of the second actuator to an address setting that is the same as an address setting of the replaced actuator or different from any other address on the communications bus. The communications bus may be a polarity-insensitive two-wire system.

An actuator for a heating, ventilating and air conditioning (HVAC) system, may incorporate an output shaft coupling, an electromagnetic mover mechanically connected to the output shaft coupling, a processor connected to the electromagnetic mover, a first potentiometer, having a set of directions of control and a plurality of ranges for addresses, connected to the processor, and a second potentiometer having a plurality of addresses, connected to the processor.

An address for the actuator may incorporate a selection of a direction of control from the set of directions of control, a range of addresses from the plurality of ranges on the first potentiometer, and an address from the plurality of addresses on the second potentiometer.

The processor may be connected to a communications bus.

The address for the actuator may be on the communications bus. Other addresses on the communications bus may be for other actuators. The communications bus may have two polarity-insensitive wires.

The actuator may further incorporate a housing that encloses the electromagnetic mover, the processor, and the first and second potentiometers. The first and second potentiometers may be accessible on at least two sides of the housing for selecting an address for the actuator on the first and second potentiometers. An address setting of the first and second potentiometer may be an analog input to the processor. The first and second potentiometers may be voltage dividers for a selection of an address as an analog input. The analog input may be converted into a digital signal at the processor.

Replacing the actuator with a substitute actuator having first and second potentiometers may incorporate selecting an address for the substitute actuator by making selections on the first and second potentiometers of substitute actuator. The substitute actuator may have an address which is the same as the address of the actuator being replaced.

Several patent documents may be relevant. U.S. Pat. No. 7,021,072, issued Apr. 4, 2006, and entitled "Current Control Loop for Actuator and Method", is hereby incorporated by reference. U.S. Pat. No. 6,505,991, issued Jan. 14, 2003, and entitled "Self-Centering Shaft Adapter", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An actuator system for a heating, ventilating and air conditioning (HVAC) setup, comprising:
   an electromechanical mover;
   a processor connected to the electromechanical mover; and
   a first potentiometer, having a set of directions of control and a plurality of ranges for addresses, connected to the processor;
   a second potentiometer having a plurality of addresses connected to the processor; and
   a housing that encloses the actuator; and
   wherein:
   access to the potentiometers for selecting or changing an address for the actuator is available on at least two sides of the housing;
   an address for the actuator comprises:
   a direction of control selected from the set of directions of control on the first potentiometer;
   a range of addresses selected from the plurality of ranges on the first potentiometer; and
   an address selected from the plurality of addresses on the second potentiometer within the range of addresses selected from the plurality of ranges for addresses.

2. The system of claim 1, wherein:
   the actuator is connected to a communications bus;
   the address for the actuator is an address of the actuator used on the communications bus.

3. The system of claim 2, further comprising:
   one or more additional actuators connected to the communications bus; and
   wherein each actuator has an address which is different from an address of the other one or more additional actuators connected to the communications bus.

4. The system of claim 3, wherein the communications bus comprises two polarity-insensitive wires.

5. The system of claim 2, further comprising a controller connected to the communications bus.

6. The system of claim 1, wherein the at least two sides of the housing reveal visible indications and physical features for selecting or changing an address for the actuator on the potentiometers.

7. The system of claim 6, wherein the controller can override a setting of the plurality of settings of the potentiometers which is a selection of an address for the actuator and can select another or the same address for the actuator via the communications bus.

8. The system of claim 1, wherein if the actuator is substituted with a replacement actuator, then an address for the replacement actuator is selected or changed via first and second potentiometers of the replacement actuator to be the same as the address of the actuator being replaced.

9. The system of claim 1, wherein an address defines an actuator in terms of one or more items of a group consisting of an activation program, actuator stroke speeds, one or more sensor outputs, input/output requirements, a slot assignment on the communications bus, one or more parameters of the actuator, and a sensor prioritization.

10. A method for establishing an address for an actuator in a heating, ventilating and air conditioning (HVAC) system, comprising:
    providing an address for an HVAC actuator on a communications bus by providing an input to the processor;
    connecting the processor to an electromagnetic mover; and
    connecting the electromagnetic mover to an HVAC actuator shaft coupling; and
    wherein:
    the input to the processor comprises an address for the HVAC actuator provided by selections made on first and second potentiometers;
    the first and second potentiometers have a plurality of selections for providing inputs to the processor;
    an address for the actuator comprises a selection of a direction of control from the set of directions of control, a range of addresses from the plurality of ranges on the first potentiometer, and an address from the plurality of addresses on the second potentiometer;
    the inputs comprise different addresses for the actuator on the communications bus; and
    the actuator shaft coupling can mechanically operate an apparatus in an HVAC system.

11. The method of claim 10, further comprising:
    enclosing the processor, the electromagnetic mover, and the first and second potentiometers in a housing; and
    wherein the housing provides access to the first and second potentiometers for selecting the address for the actuator at two or more sides on the housing.

12. The method of claim 11, further comprising:
    replacing the actuator with a second HVAC actuator; and
    setting the first and second potentiometers of the second actuator to an address setting that is the same as an address setting of the replaced actuator or different from any other address on the communications bus.

13. The method of claim 10, wherein the communications bus is a polarity-insensitive two-wire system.

14. An actuator for a heating, ventilating and air conditioning (HVAC) system, comprising:
    an output shaft coupling;
    an electromagnetic mover mechanically connected to the output shaft coupling;
    a processor connected to the electromagnetic mover;
    a first potentiometer, having a set of directions of control and a plurality of ranges for addresses, connected to the processor; and
    a second potentiometer having a plurality of addresses, connected to the processor; and
    wherein:
    an address for the actuator comprises a selection of a direction of control from the set of directions of control, a range of addresses from the plurality of ranges on the first potentiometer, and an address from the plurality of addresses on the second potentiometer.

15. The actuator of claim 14, wherein:
    the processor is connected to a communications bus;
    the address for the actuator is on the communications bus; and other addresses on the communications bus are for other actuators.

16. The actuator of claim 14, further comprising:
a housing that encloses the electromagnetic mover, the processor and the first and second potentiometers; and
wherein the first and second potentiometers are accessible on at least two sides of the housing for selecting an address for the actuator on the first and second potentiometers.

17. The actuator of claim 16, wherein:
replacing the actuator with a substitute actuator having first and second potentiometers comprises selecting an address for the substitute actuator by making selections on the first and second potentiometers of substitute actuator; and
the substitute actuator has an address which is the same as the address of the actuator being replaced.

18. The actuator of claim 16, wherein the communications bus comprises two polarity-insensitive wires.

19. The actuator of claim 14, wherein an address setting of the first and second potentiometer is an analog input to the processor.

20. The actuator of claim 14, wherein:
the first and second potentiometers are voltage dividers for a selection of an address as an analog input; and
the analog input is converted into a digital signal at the processor.

* * * * *